United States Patent
Komura et al.

(10) Patent No.: US 8,248,890 B2
(45) Date of Patent: Aug. 21, 2012

(54) THERMALLY-ASSISTED HEAD INCLUDING SURFACE-PLASMON RESONANT OPTICAL SYSTEM

(75) Inventors: Eiji Komura, Tokyo (JP); Tsutomu Chou, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 10 days.

(21) Appl. No.: 12/946,196

(22) Filed: Nov. 15, 2010

(65) Prior Publication Data

US 2012/0120781 A1    May 17, 2012

(51) Int. Cl.
G11B 7/00    (2006.01)
G11B 7/08    (2006.01)

(52) U.S. Cl. .................... 369/13.02; 369/13.22; 720/658

(58) Field of Classification Search ................ 369/13.33, 369/13.13, 13.32, 112.23, 112.27, 13.24, 369/13.02, 13.22; 360/59; 356/445, 601; 720/658

See application file for complete search history.

(56) References Cited

U.S. PATENT DOCUMENTS

| | | | |
|---|---|---|---|
| 6,649,894 B2 | 11/2003 | Matsumoto et al. | |
| 6,768,556 B1 | 7/2004 | Matsumoto et al. | |
| 7,500,255 B2 * | 3/2009 | Seigler et al. | 720/658 |
| 8,089,830 B2 * | 1/2012 | Isogai et al. | 369/13.33 |
| 2004/0057144 A1 | 3/2004 | Lewis et al. | |
| 2007/0097694 A1 | 5/2007 | Faase et al. | |
| 2010/0103553 A1 | 4/2010 | Shimazawa et al. | |

OTHER PUBLICATIONS

D.F.P. Pile and D.K. Gramotnev, "A Nano-scale Fabry-Perot interferometer using channel Plasmon-polaritons in triangular metallic grooves", Applied Physics Letters, 86(16). p. 161101.
U.S. Appl. No. 12/848,422, filed Aug. 2, 2010 for Eiji Komura, et al.
U.S. Appl. No. 12/557,078, filed Sep. 10, 2009 for Daisuke Miyauchi, et al.

* cited by examiner

*Primary Examiner* — Nabil Hindi
(74) *Attorney, Agent, or Firm* — Frommer Lawrence & Haug LLP

(57) ABSTRACT

Provided is a surface plasmon resonating optical system emitting near-field light (NF-light) with a higher light density. The system comprises: a waveguide through which a light for exciting surface plasmon propagates; a plasmon generator that couples with the light in a surface plasmon mode and emits NF-light from its NF-light generating end surface; and a resonator mirror that reflects the excited surface plasmon, provided on the side of the plasmon generator opposite to the NF-light generating end surface. In the system, the excited surface plasmon can be amplified by using a resonator structure while reducing the length of the plasmon generator to reduce absorption of surface plasmon and prevent overheating of the plasmon generator.

19 Claims, 11 Drawing Sheets

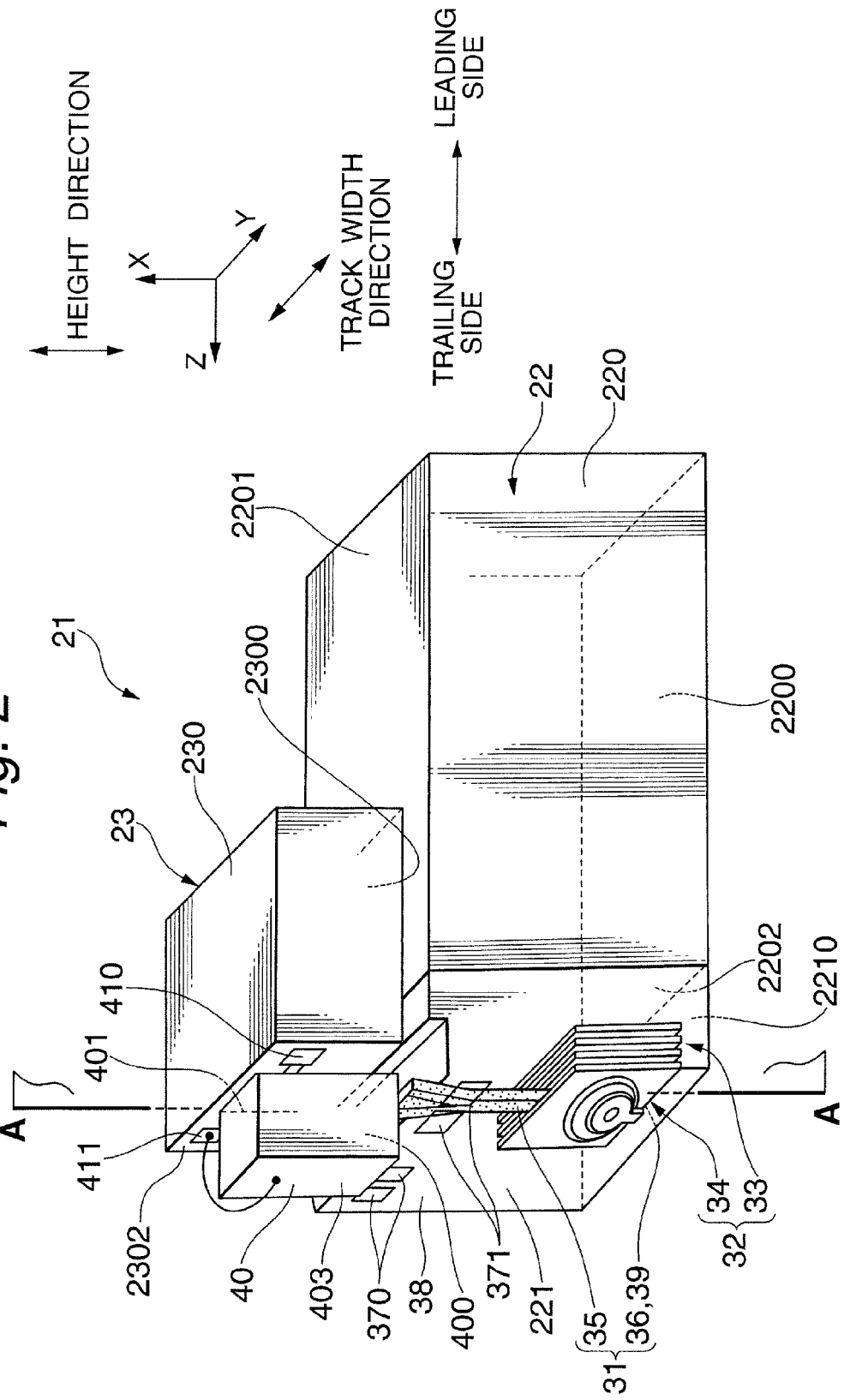

THERMALLY-ASSISTED HEAD INCLUDING SURFACE-PLASMON RESONANT OPTICAL SYSTEM

BACKGROUND OF THE INVENTION

1. Field of the Invention

The present invention relates to an optical system for generating and resonating surface plasmon and emitting near-field light (NF-light), especially to a thermally-assisted magnetic recording head provided with an optical system including a plasmon generator, for irradiating a magnetic recording medium with NF-light, thereby lowering anisotropic magnetic field of the medium and thus writing data. Further, the present invention relates to a magnetic recording apparatus provided with the head.

2. Description of the Related Art

With the explosion in the use of the Internet in these years, a huge amount of data that are incommensurably larger than ever are stored and used on servers, information processing terminals, home electric appliances and so on. This trend is expected to further grow at an accelerated rate. Under these circumstances, demand for magnetic recording apparatuses such as magnetic disk apparatuses as mass storage is growing, and the demand for higher recording densities of the magnetic recording apparatuses is also escalating.

In the magnetic recording technology, it is necessary for magnetic heads to write smaller recording bits on magnetic recording media in order to achieve higher recording densities. In order to stably form smaller recording bits, perpendicular magnetic recording technology has been commercially implemented in which components of magnetization perpendicular to the surface of a medium are used as recording bits. In addition, thermally-assisted magnetic recording technology that enables the use of magnetic recording media having higher thermal stability of magnetization is being actively developed.

In the thermally-assisted magnetic recording technology, a magnetic recording medium formed of a magnetic material with a large magnetic anisotropy energy $K_U$ is used so as to stabilize the magnetization; anisotropic magnetic field (coercive force) of the medium is reduced by applying heat to a portion of the medium where data is to be written; just after that, writing is performed by applying write magnetic field (write field) to the heated portion. Generally proposed is a method in which the magnetic recording medium is irradiated and heated with near-field light (NF-light). The spot of the NF-light is set to be minute; the very small spot size can be realized which is free of diffraction limit. For example, U.S. Pat. No. 6,768,556 and U.S. Pat. No. 6,649,894 disclose a technique in which NF-light is generated by irradiating a metal scatterer with light and by matching the frequency of the light with the resonant frequency of plasmon excited in the metal.

As described above, various kinds of thermally-assisted magnetic recording systems with elements that generate NF-light have been proposed. Meanwhile, the present inventors have devised a technique in which laser light (waveguide light) that propagates through a waveguide is coupled with a plasmon generator in a surface plasmon mode, and surface plasmon excited in the plasmon generator is propagated to an opposed-to-medium surface, thereby providing NF-light, instead of directly applying the laser light to an element that generates NF-light. Such a plasmon generator is disclosed, for example, in UP Patent Publication No. 2010/0103553 A1.

In the plasmon generator, its temperature does not excessively rise because the waveguide light is not directly applied to the plasmon generator. As a result, there can be avoided a situation in which the end of a read head element, which reaches the opposed-to-medium surface, becomes relatively far apart from the magnetic recording medium due to the thermal expansion of the plasmon generator, which makes it difficult to properly read servo signals during recording operations. In addition, there can also be avoided a situation in which the light use efficiency of an optical system including the waveguide and the plasmon generator is degraded because thermal fluctuation of free electrons increases in the plasmon generator. Here, the light use efficiency is given by $I_{OUT}/I_{IN}$ ($\times 100$), where $I_{IN}$ is the intensity of laser light incident to the waveguide, and $I_{OUT}$ is the intensity of NF-light emitted from a NF-light generating end of the generator.

In the optical system that generates plasmon described above, it is critically important to increase the light use efficiency described above in order to sufficiently reduce anisotropic magnetic field of a magnetic recording medium by irradiating the magnetic recording medium with NF-light having a sufficient intensity.

One way to increase the light use efficiency is to sufficiently strongly couple waveguide light to the plasmon generator in a surface plasmon mode. Here, the coupling in the surface plasmon mode can be achieved by arranging the waveguide and the plasmon generator so that they face each other or are in contact with each other in a predetermined area. To achieve a sufficiently strong coupling in the surface plasmon mode in the arrangement, it is effective to provide a sufficiently large area in which they face each other or are in contact with each other. In that case, the overall length of the plasmon generator needs to be longer. However, a longer plasmon generator, which is made of metal, absorbs excited surface plasmon more as the surface plasmon propagate along the longer propagation path. As a result, the amount of surface plasmon which generates NF-light decreases, possibly decreasing the light use efficiency. Furthermore, the temperature of the plasmon generator which absorbed surface plasmon increases and the plasmon generator might melt.

Therefore, it is understood that, in order to perform appropriate thermally-assisted magnetic recording, it is a critical issue in the optical system including the plasmon generator to achieve higher light use efficiency while reducing absorption of surface plasmon into the plasmon generator to prevent overheating of the plasmon generator.

SUMMARY OF THE INVENTION

Some terms used in the specification will be defined before explaining the present invention. In a layered structure or an element structure formed on an element-formation surface of a slider substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z direction corresponds to a trailing side and −Z direction to a leading side. And Y-axis direction indicates a track width direction, and X-axis direction indicates a height direction.

Further, a "side surface" of a waveguide provided within the magnetic recording head is defined as an end surface other than the end surfaces substantially perpendicular to the direction in which light propagates within the waveguide (−X direction), out of all the end surfaces surrounding the waveguide. According to the definition, an "upper surface"

and a "lower surface" are one of the "side surfaces". The "side surface" is a surface on which the propagating light can be totally reflected in the waveguide that corresponds to a core.

According to the present invention, a surface plasmon resonating optical system is provided, which comprises:

a waveguide through which a light for exciting surface plasmon propagates;

a plasmon generator configured to be coupled with the light in a surface plasmon mode and to emit near-field light (NF-light) from its NF-light generating end surface; and a resonator mirror provided on a side of the plasmon generator that is opposite to the NF-light generating end surface, and configured to reflect the excited surface plasmon.

In this above-described surface plasmon resonating optical system, NF-light that has a higher light density can be generated by amplifying excited surface plasmon by using a resonator structure while reducing the length of the plasmon generator to reduce absorption of surface plasmon and prevent overheating of the plasmon generator.

In the above-described surface plasmon resonating optical system according to the present invention, the resonator mirror is preferably one mirror in a Fabry-Perot resonator in which the other mirror is an object to be irradiated with the NF-light. Here, the Fabry-Perot resonator is a type of resonator in which reflecting mirrors are provided at both ends of a path along which light (electromagnetic field) propagates, in such a manner that the reflecting surfaces of the reflecting mirrors face each other. Further, it is preferable that a length of the plasmon generator is equal to or more than $(\lambda_0 \cdot m/(2 \cdot n_{EFFPG})) - 0.275 \cdot (\lambda_0/(2 \cdot n_{EFFPG}))$, and less than or equal to $(\lambda_0 \cdot m/(2 \cdot n_{EFFPG})) + 0.275 \cdot (\lambda_0/(2 \cdot n_{EFFPG}))$, where $\lambda_0$ is a wavelength of the light in a vacuum, $n_{EFFPG}$ is an effective refractive index when the surface plasmon propagates along the plasmon generator, and m is a natural number. Furthermore, the plasmon generator preferably comprises a propagation edge that extends to the NF-light generating end surface and propagates the surface plasmon excited by the light. In this preferable case, an end of the propagation edge that is opposite to the NF-light generating end surface preferably abuts on a reflecting surface of the resonator mirror.

According to the present invention, a thermally-assisted magnetic recording head is further provided, which comprises:

a magnetic pole that generates write field from its end on an opposed-to-medium surface side;

a waveguide through which a light for exciting surface plasmon propagates;

a plasmon generator provided between the magnetic pole and waveguide, and configured to be coupled with the light in a surface plasmon mode and to emit NF-light from its NF-light generating end surface on the opposed-to-medium surface side; and a resonator mirror provided on a side of the plasmon generator that is opposite to the NF-light generating end surface, and configured to reflect the excited surface plasmon.

In this thermally-assisted magnetic recording head, NF-light that has a higher light density can be generated by amplifying excited surface plasmon by using a resonator structure while reducing the length of the plasmon generator to reduce absorption of surface plasmon and prevent overheating of the plasmon generator. As a result, a plasmon resonating optical system that offers higher light use efficiency can be implemented and can be used to perform thermally-assisted magnetic recording with a higher recording density.

In the above-described thermally-assisted magnetic recording head according to the present invention, the plasmon generator preferably comprises a propagation edge that extends to the NF-light generating end surface (opposed-to-medium surface) and propagates the surface plasmon excited by the light. Here, as one embodiment of the case with the propagation edge, the magnetic pole is preferably in surface contact with a surface portion of the plasmon generator, the surface portion excluding the propagation edge. As another embodiment, it is also preferable that the plasmon generator comprises an opposed-to-waveguide surface that is opposed to the waveguide with a predetermined distance, and the propagation edge is located on a side opposite to the opposed-to-waveguide surface. Further, as another embodiment, it is also preferable that the plasmon generator comprises a contact-to-waveguide surface that is in surface contact with the waveguide, and the propagation edge is located on a side opposite to the contact-to-waveguide surface. Furthermore, as another embodiment, at least a portion of the propagation edge is preferably opposed to the waveguide with a predetermined distance and couples with the light in a surface plasmon mode.

Further, in the above-described thermally-assisted magnetic recording head according to the present invention, the plasmon generator is preferably covered with a material that has a refractive index lower than a refractive index of a constituent material of the waveguide. A part of the material functions as a buffering portion that effects the induction of a surface plasmon mode. Further, a magnetic shield is preferably provided on a side opposite to the magnetic pole when viewed from the plasmon generator.

According to the present invention, a head gimbal assembly (HGA) is provided, which comprises the above-described thermally-assisted magnetic recording head and a suspension supporting the thermally-assisted magnetic recording head.

According to the present invention, a magnetic recording apparatus is provided, which comprises: the above-described HGA; at least one magnetic recording medium; and a recording circuit configured to control write operations that the thermally-assisted magnetic recording head performs to the at least one magnetic recording medium, the recording circuit further comprising a light-emission control circuit configured to control operations of a light source that generates the light for exciting surface plasmon. Here, the resonator mirror and a portion of the magnetic recording medium that faces the NF-light generating end surface preferably constitute a Fabry-Perot resonator.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIG. 2 shows a perspective view illustrating an embodiment of the thermally-assisted magnetic recording head according to the present invention;

DESCRIPTION OF THE PREFERRED EMBODIMENTS

Figure 1A:
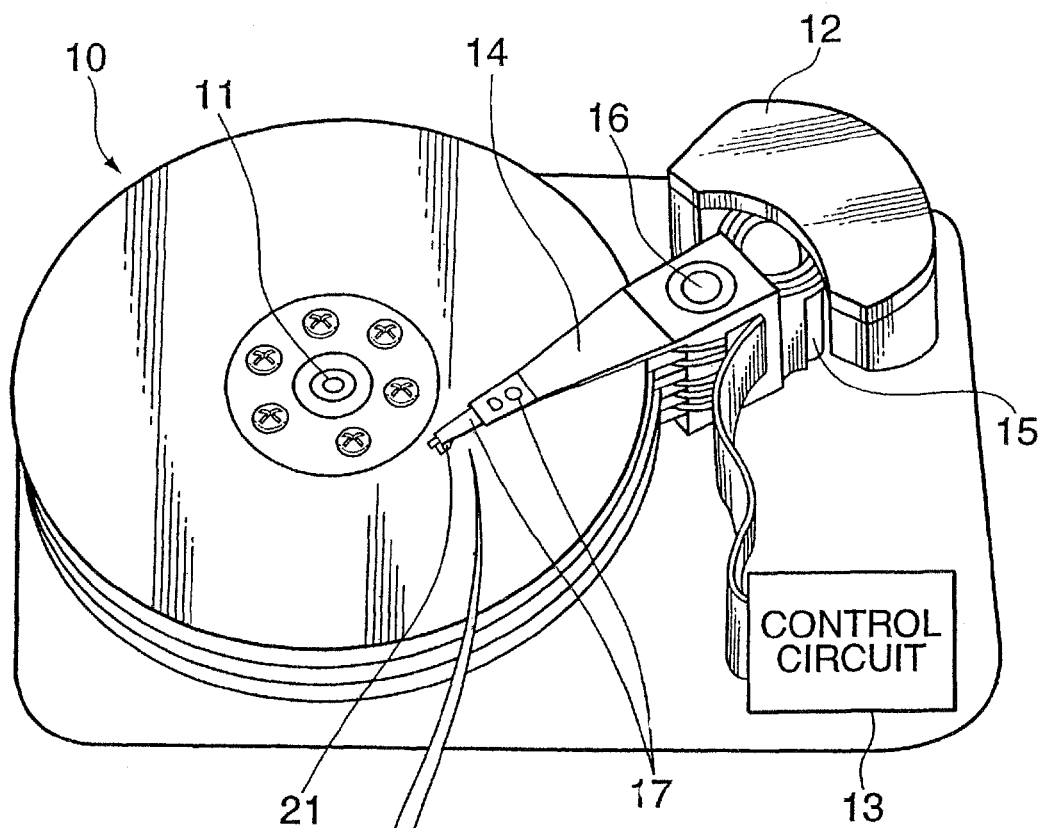
FIG. 1a shows a perspective view schematically illustrating an embodiment of a magnetic recording apparatus according to the present invention.
Figure 1B:
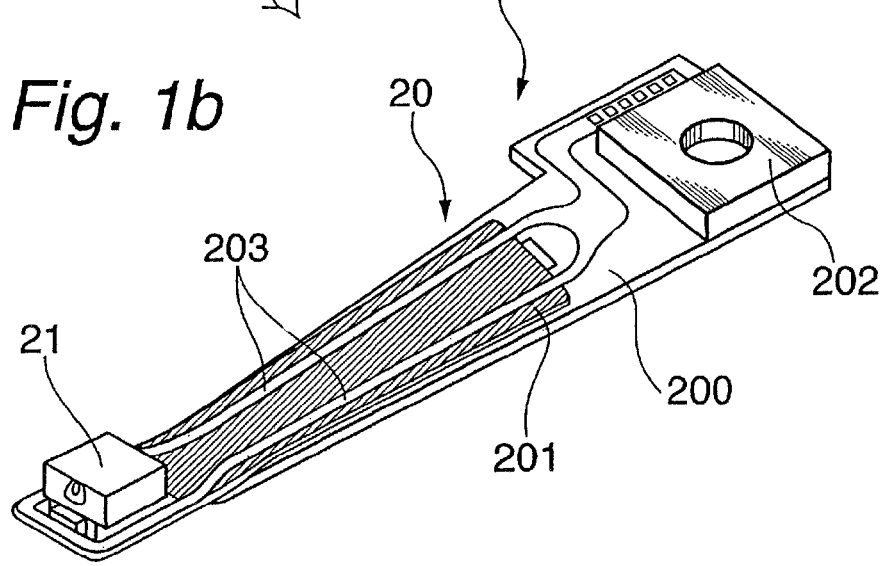
FIG. 1b shows a perspective view schematically illustrating an embodiment of a head gimbal assembly (HGA) according to the present invention.

FIG. 1a shows a perspective view schematically illustrating an embodiment of a magnetic recording apparatus according to the present invention. FIG. 1b shows a perspective view schematically illustrating an embodiment of a head gimbal assembly (HGA) according to the present invention. Here, in the perspective view of the HGA, the side of the HGA, which is opposed to the surface of the magnetic recording medium, is presented as the upper side.

A magnetic disk apparatus as a magnetic recording apparatus shown in FIG. 1a includes: a plurality of magnetic disks 10 as magnetic recording media, rotating around a rotational axis of a spindle motor 11; an assembly carriage device 12 provided with a plurality of drive arms 14 therein; a head gimbal assembly (HGA) 17 attached on the top end portion of each drive arm 14 and provided with a thermally-assisted magnetic recording head 21 as a thin-film magnetic head; and a recording/reproducing and light-emission control circuit 13 for controlling write/read operations of the thermally-assisted magnetic recording head 21 and further for controlling the emission operation of a laser diode as a light source that generates laser light used for thermally-assisted magnetic recording, which will be described later.

In the present embodiment, the magnetic disk 10 is designed for perpendicular magnetic recording, and has a structure in which sequentially stacked on a disk substrate is a soft-magnetic under layer, an intermediate layer, and a magnetic recording layer (perpendicular magnetization layer). The assembly carriage device 12 is a device for positioning the thermally-assisted magnetic recording head 21 above a track on which recording bits are aligned, the track being formed on the magnetic recording layer of the magnetic disk 10. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and thermally-assisted magnetic recording heads 21 may be single.

Referring to FIG. 1b, a suspension 20 in the HGA 17 includes a load beam 200, a flexure 201 with elasticity fixed to the load beam 200, and a base plate 202 provided on the base portion of the load beam 200. Further, on the flexure 201, there is provided a wiring member 203 that is made up of lead conductors and connection pads electrically joined to both ends of the lead conductors. The thermally-assisted magnetic recording head 21 is fixed to the flexure 201 at the top end portion of the suspension 20 so as to face the surface of the magnetic disk 10 with a predetermined spacing (flying height). Moreover, one end of the wiring member 203 is electrically connected to terminal electrodes of the thermally-assisted magnetic recording head 21. The structure of the suspension 20 is not limited to the above-described one. An IC chip for driving the head may be mounted midway on the suspension 20, though not shown.

FIG. 2 shows a perspective view illustrating an embodiment of thermally-assisted magnetic recording head 21 according to the present invention.

As shown in FIG. 2, a thermally-assisted magnetic recording head 21 is constituted of the slider 22 and the light source unit 23. The slider 22 includes: a slider substrate 220 formed of, for example, a ceramic material such as AlTiC ($Al_2O_3$—TiC) or silicon oxide ($SiO_2$), and having an air bearing surface (ABS) 2200 processed so as to provide an appropriate flying height; and a head element part 221 formed on an element-formation surface 2202 perpendicular to and adjacent to the ABS 2200. While, the light source unit 23 includes: a unit substrate 230 formed of, for example, a ceramic or semiconductor material such as AlTiC ($Al_2O_3$—TiC), Si, GaAs or SiC, and having an joining surface 2300; and a laser diode 40 as a light source provided on a source-installation surface 2302 perpendicular to and adjacent to the joining surface 2300. The slider 22 and the light source unit 23 are bonded to each other by using, for example, a solder in such a way that the back surface 2201 of the slider substrate 220 and the joining surface 2300 of the unit substrate 230 are joined to each other. Here, the back surface 2201 of the slider substrate 220 is defined as an end surface opposite to the ABS 2200 of the slider substrate 220. Alternatively, the thermally-assisted magnetic recording head 21 may have a configuration in which the laser diode 40 is provided directly on the slider 22 without using the light source unit 23.

In the slider 22, the head element part 221 formed on the element-formation surface 2202 of the slider substrate 220 includes: a head element 32 constituted of a magnetoresistive (MR) element 33 for reading data from a magnetic disk and an electromagnetic transducer 34 for writing data to the magnetic disk; a waveguide 35 for guiding laser light generated from a laser diode 40 provided in the light source unit 23 to the opposed-to-medium surface side; a plasmon generator 36 for coupling with laser light (waveguide light) in a surface plasmon mode to excite surface plasmon, the waveguide light propagating through the waveguide 35, and for generating near-field light (NF-light); a resonator mirror 39 provided for improving light density of NF-light generated from the plasmon generator, acting as a reflecting mirror of a resonator; an overcoat layer 38 formed on the element-formation surface 2202 in such a way as to cover the MR element 33, the electromagnetic transducer 34, the waveguide 35, the plasmon generator 36, and the resonator mirror 39; a pair of terminal electrodes 370 exposed in the upper surface of the overcoat layer 38 and electrically connected to the MR element 33; and a pair of terminal electrodes 371 also exposed in the upper surface of the overcoat layer 38 and electrically connected to the electromagnetic transducer 34. Here, the waveguide 35, the plasmon generator 36 and the resonator mirror 39 constitute a plasmon resonating optical system 31 for generating NF-light used for thermal assist. Further, the terminal electrodes 370 and 371 are electrically connected to the connection pads of the wiring member 203 provided on the flexure 201 (FIG. 1b).

One ends of the MR element 33, the electromagnetic transducer 34 and the plasmon generator 36 reach a head end surface 2210, which is an opposed-to-medium surface of the head part 221. Here, the head end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk with a predetermined flying height. Thus, the ends of the MR element 33 and electromagnetic transducer 34 face the surface of the magnetic recording layer of the magnetic disk 10 (FIG. 1a) with an appropriate magnetic spacing. Then, the MR element 33 reads data by sensing signal magnetic field from the magnetic recording layer, and the electromagnetic transducer 34 writes data by applying signal magnetic field to the magnetic recording layer.

When writing data, laser light generated from the laser diode 40 of the light source unit 23 propagates through the waveguide 35. Then, the propagating laser light (waveguide light) is coupled with the plasmon generator 36 in a surface plasmon mode, and causes surface plasmon to be excited on the plasmon generator 36. The excited surface plasmon (electromagnetic field) propagates on a propagation edge 360 (FIG. 4) provided in the plasmon generator 36, which will be explained later, toward the head end surface 2210, and resonates between the resonator mirror 39 and surface of the magnetic recording layer of the magnetic disk 10, which will also be explained later. As a result, NF-light with a very high light density is generated from the end of the plasmon generator 36 on the head end surface 2210 side. The generated NF-light reaches the surface of the magnetic disk, and heats a portion of the magnetic recording layer of the magnetic disk. As a result, the anisotropic magnetic field (coercive force) of the portion is decreased sufficiently to a value that enables writing; thus good thermally-assisted magnetic recording can be accomplished by applying write field generated from the electromagnetic transducer 34 to the portion with sufficiently decreased anisotropic magnetic field.

Figure 3:
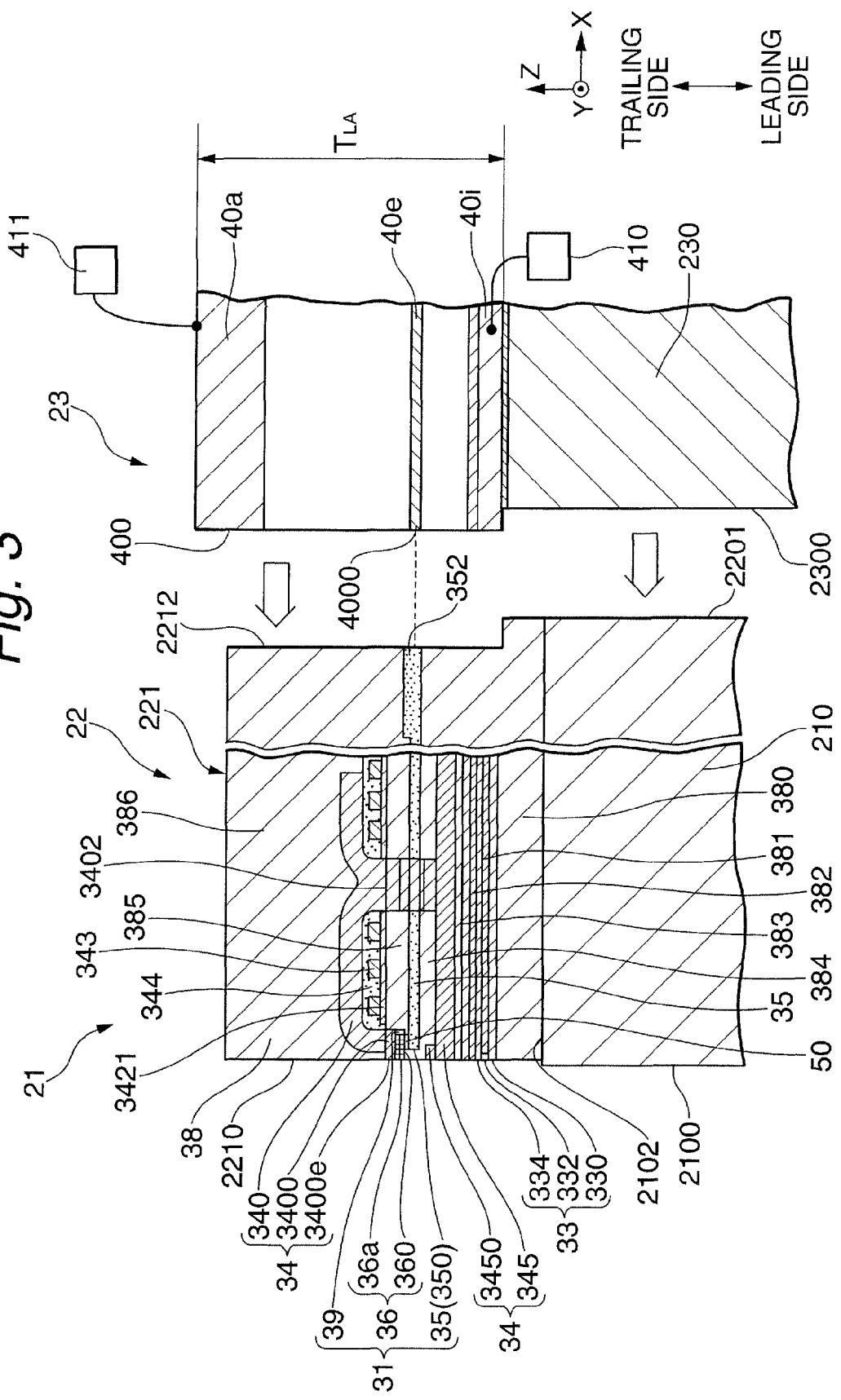
FIG. 3 shows a cross-sectional view taken by plane A in FIG. 2, schematically illustrating the structure of a main part of the thermally-assisted magnetic recording head according to the present invention.

FIG. 3 shows a cross-sectional view taken by plane A in FIG. 2, schematically illustrating the structure of a main part of the thermally-assisted magnetic recording head 21.

As shown in FIG. 3, the MR element 33 is formed on an insulating layer 380 stacked on the element-formation surface 2202, and includes: an MR multilayer 332; and a lower shield layer 330 and an upper shield layer 334 which sandwich the MR multilayer 332 and an insulating layer 381 therebetween. The upper and lower shield layers 334 and 330 prevent the MR multilayer 332 from receiving external magnetic field as a noise. The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes.

Referring also to FIG. 3, the electromagnetic transducer 34 is designed for perpendicular magnetic recording, and includes an upper yoke layer 340, a main magnetic pole 3400, a write coil layer 343, a coil-insulating layer 344, a lower yoke layer 345, and a lower shield 3450.

Figure 5:
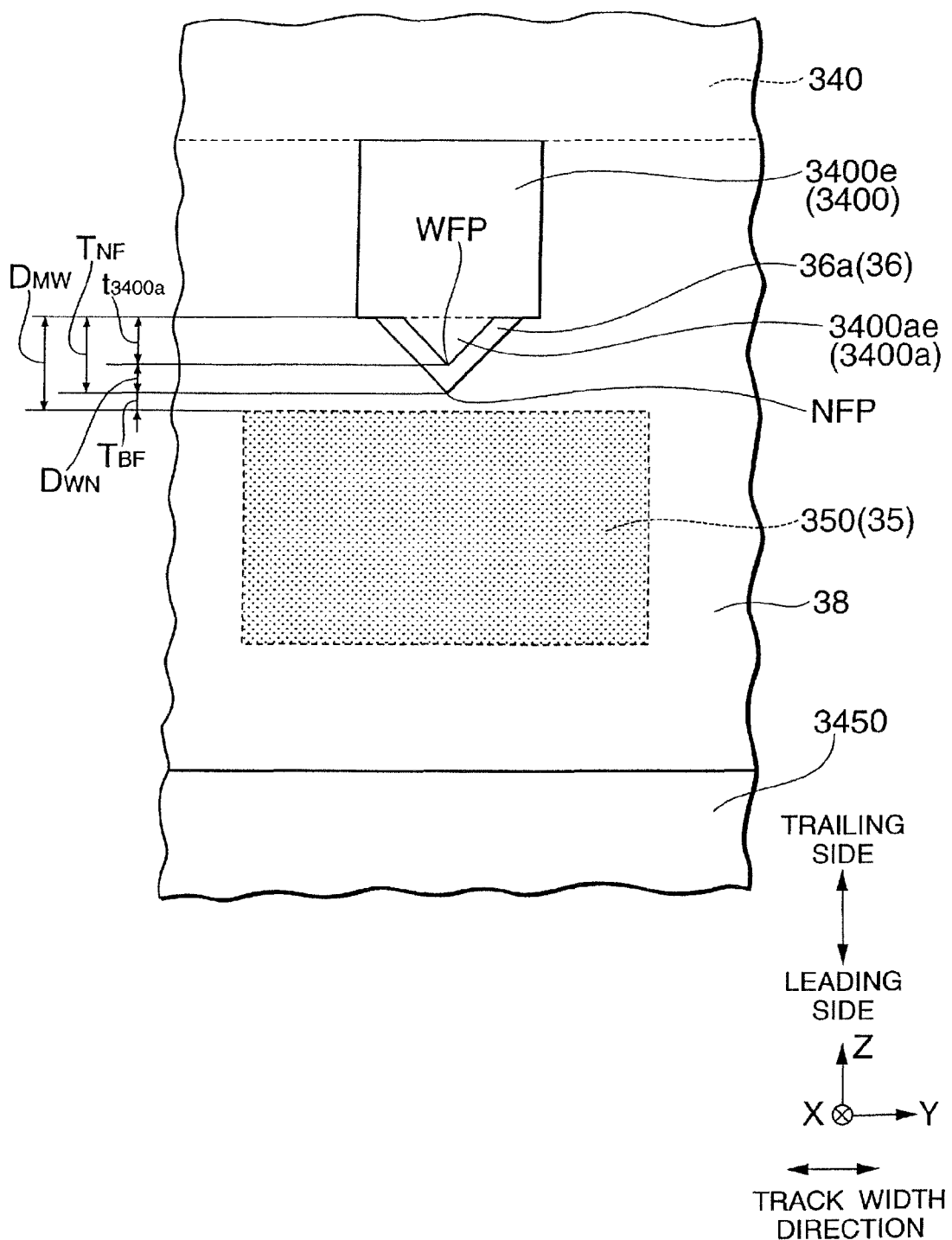
FIG. 5 shows a plan view illustrating shapes of the end surfaces of the waveguide, the plasmon generator and the electromagnetic transducer on the head end surface or in its vicinity.

The upper yoke layer 340 is formed so as to cover the coil-insulating layer 344, and the main magnetic pole 3400 is formed on an insulating layer 385 made of an insulating material such as $Al_2O_3$ (alumina). These upper yoke layer 340 and main magnetic pole 3400 are magnetically connected with each other, and acts as a magnetic path for converging and guiding magnetic flux toward the magnetic recording layer (perpendicular magnetization layer) of the magnetic disk, the magnetic flux being excited by write current flowing through the write coil layer 343. The main magnetic pole 3400 reaches the head end surface 2210, and the end surface 3400e of the pole 3400, which is a portion of the end surface 2210, has a vertex closest to the lower shield 3450 (most on the leading side), the vertex being a point (WFP: FIG. 5) where write field is generated. This minute write-field-generating point of the main magnetic pole 3400 enables a fine write field responding to higher recording density to be generated. The main magnetic pole 3400 is formed of a soft-magnetic material with a saturation magnetic flux density higher than that of the upper yoke layer 340, which is, for example, an iron alloy containing Fe as a main component, such as FeNi, FeCo, FeCoNi, FeN or FeZrN. The thickness of the main magnetic pole is, for example, in the range of approximately 0.1 to 0.8 μm (micrometer).

The write coil layer 343 is formed on an insulating layer 3421 made of an insulating material such as $Al_2O_3$ (alumina), in such a way as to pass through in one turn at least between the lower yoke layer 345 and the upper yoke layer 340, and has a spiral structure with a back contact portion 3402 as a center. The write coil layer 343 is formed of a conductive material such as Cu (copper). The write coil layer 343 is covered with a coil-insulating layer 344 that is formed of an insulating material such as a heat-cured photoresist and electrically isolates the write coil layer 343 from the upper yoke layer 340. The write coil layer 343 has a monolayer structure in the present embodiment. However, the write coil layer 343 may have a two or more layered structure, or may have a helical coil shape in which the upper yoke layer 340 is sandwiched therebetween. Further, the number of turns of the write coil layer 343 is not limited to that shown in FIG. 3, and may be, for example, in the range from two to seven.

The back contact portion 3402 has a though-hole extending in X-axis direction, and the waveguide 35 and insulating layers that cover the waveguide 35 pass through the though-hole. In the though-hole, the waveguide 35 is away at a predetermined distance of, for example, at least 1 μm from the inner wall of the back contact portion 3402. The distance prevents the absorption of the waveguide light by the back contact portion 3402.

The lower yoke layer 345 is formed on an insulating layer 383 made of an insulating material such as $Al_2O_3$ (alumina), and acts as a magnetic path for the magnetic flux returning from a soft-magnetic under layer that is provided under the magnetic recording layer (perpendicular magnetization layer) of the magnetic disk 10 (FIG. 1a). The lower yoke layer 345 is formed of a soft-magnetic material, and its thickness is, for example, approximately 0.5 to 5 μm. Further, the lower shield 3450 is a magnetic shield that reaches the head end surface 2210, being magnetically connected with the lower yoke layer 345. The lower shield 3450 is provided on the opposite side to the main magnetic pole 3400 when viewed from the plasmon generator 36 and is opposed to the main magnetic pole 3400 through the plasmon generator 36, and acts for receiving the magnetic flux spreading from the main magnetic pole 3400. The lower shield 3450 is preferably formed of a material with high saturation magnetic flux density such as NiFe (Permalloy) or an iron alloy as the main magnetic pole 3400 is formed of.

Referring also to FIG. 3, the waveguide 35, the plasmon generator 36 and the resonator mirror 39 are provided between the lower yoke layer 345 (lower shield 3450) and an upper yoke layer 340 (main magnetic pole 3400), and form a plasmon resonating optical system 31 for generating NF-light in the head element part 221. The waveguide 35 is provided in parallel with an element-formation surface 2202 and extends from the rear end surface 352 which is a portion of the head rear end surface 2212 to the end surface 350 on the head end surface 2210 side. A portion of the upper surface (side surface) of the waveguide 35 and a portion of the lower surface (including a propagation edge 360) of the plasmon generator 36 are opposed to each other with a predetermined distance therebetween. An insulating-layer portion sandwiched between these portions forms a buffering portion 50 that has a refractive index lower than that of the waveguide 35. The buffering portion 50 couples laser light (waveguide light) propagating through the waveguide 35 to the plasmon generator 36 in a surface plasmon mode.

The plasmon generator 36 is located between a waveguide 35 and a main magnetic pole 3400. The plasmon generator 36 includes a NF-light generating end surface 36a which forms a part of the head end surface 2210. The plasmon generator 36 further includes a propagation edge 360 at least a portion of which faces the waveguide 35 with a buffer portion 50 between them. The propagation edge 360 extends to the NF-light generating end surface 36a and propagates surface plasmon excited by waveguide light that has traveled through the waveguide 35. The plasmon generator 36 couples with the waveguide light in a surface plasmon mode, excites surface plasmon, and propagates the excited surface plasmon along the propagation edge 360 to generate NF-light from the NF-light generating end surface 36a.

The resonator mirror 39 is provided on the side opposite to the NF-light generating end surface 36a (on +X side) from the plasmon generator 36 and functions as reflecting the excited surface plasmon. By the reflection, surface plasmon (electromagnetic field) propagating along the propagation edge 360 resonates between the resonator mirror 39 and the surface of the magnetic recording layer of the magnetic disk 10 to form a standing wave. As a result, the amplitude of the surface plasmon increases so that NF-light having a very high light density can be generated from the NF-light generating end surface 36a of the plasmon generator 36.

The main magnetic pole 3400 is in surface contact with a surface portion of the plasmon generator 36, the surface portion excluding the propagation edge 360. That is, the main magnetic pole 3400 and the plasmon propagation edge 360 are separated from each other with a predetermined distance. As a result, there can be avoided significant reduction in light use efficiency of the plasmon resonating optical system due to much absorption of surface plasmon propagating along the propagation edge 360 into the main magnetic pole 3400 made of a magnetic metal. Configuration of the waveguide 35, the plasmon generator 36, the resonator mirror 39, and the main magnetic pole 3400 will be described later in detail with reference to FIGS. 4 to 6.

Also according to FIG. 3, the light source unit 23 includes: a laser diode 40 provided on the source-installation surface 2302 of a unit substrate 230; a terminal electrode 410 electrically connected to a lower electrode 40i as a lower surface of the laser diode 40; and a terminal electrode 411 electrically connected to an upper electrode 40a as an upper surface of the laser diode 40. The terminal electrodes 410 and 411 are electrically connected to the connection pads of the wiring member 203 provided on the flexure 201 (FIG. 1). By applying a predetermined voltage between both electrodes 410 and 411 of the laser diode 40, laser light is emitted from the emission center on an emission surface 400 of the laser diode 40. Here, in the configuration of the head as shown in FIG. 3, the oscillation of electric field component of the laser light generated from the laser diode 40 preferably has a direction perpendicular to the stacking surface of the active layer 40e (Z-axis direction). That is, the laser diode 40 preferably generates a laser light with TM polarization. This enables the laser light propagating through the waveguide 35 to be coupled with the plasmon generator 36 through the buffering portion 50 in a surface plasmon mode.

A light source such as InP base, GaAs base or GaN base diode can be utilized as the laser diode 40, which is usually used for communication, optical disk storage or material analysis. The wavelength $\lambda_L$ of the radiated laser light may be, for example, in the range of approximately 375 nm (nanometers) to 1.7 µm. The laser diode 40 has a multilayered structure including an upper (n-type) electrode 40a, an active layer 40e, and a lower (p-type) electrode 40i. On the front and rear cleaved surfaces of the multilayered structure of the laser diode 40, respectively formed are reflective layers for exciting the oscillation by total reflection. Here, the laser diode 40 has a thickness $T_{LA}$ in the range of, for example, approximately 60 to 200 µm.

Further, an electric source provided within the magnetic disk apparatus can be used for driving the laser diode 40. In fact, the magnetic disk apparatus usually has an electric source with applying voltage of, for example, approximately 2 to 5V, which is sufficient for the laser oscillation. The amount of electric power consumption of the laser diode 40 is, for example, in the order of several tens mW, which can be covered sufficiently by the electric source provided within the magnetic disk apparatus. The laser diode 40 and terminal electrodes 410 and 411 are not limited to the above-described embodiment. For example, the electrodes of the laser diode 40 can be turned upside down, thus the n-electrode 40a may be bonded to the source-installation surface 2302 of the unit substrate 230. Further, alternatively, a laser diode may be provided on the element-formation surface 2202 of the thermally-assisted magnetic recording head 21, and then can be optically connected with the waveguide 35. Furthermore, the thermally-assisted magnetic recording head 21 may include no laser diode 40; then, the light-emission center of a laser diode provided within the magnetic disk apparatus and the rear-end surface 352 of the waveguide 35 may be connected by using, for example, optical fiber.

Each of the slider 22 and light source unit 23 may have an arbitrary size. For example, the slider 22 may be so-called a femto slider in which the width in the track width direction (Y-axis direction) is 700 µm; the length (in Z-axis direction) is 850 µm; and the thickness (in X-axis direction) is 230 µm. In the case, the light source unit 23 may be one size smaller than the slider 22, and may have a size, for example, in which the width in the track width direction is 425 µm; the length is 300 µm; and the thickness is 300 µm.

By joining the above-described light source unit 23 and slider 22, constituted is the thermally-assisted magnetic recording head 21. In the joining, the joining surface 2300 of the unit substrate 230 is made having a surface contact with the back surface 2201 of the slider substrate 220. Then, the locations of the unit substrate 230 and the slider substrate 220 are determined in such a way that the laser light generated from the laser diode 40 can directly enter the waveguide 35 through the rear-end surface 352 opposite to the ABS 2200 of the waveguide 35.

Figure 4:
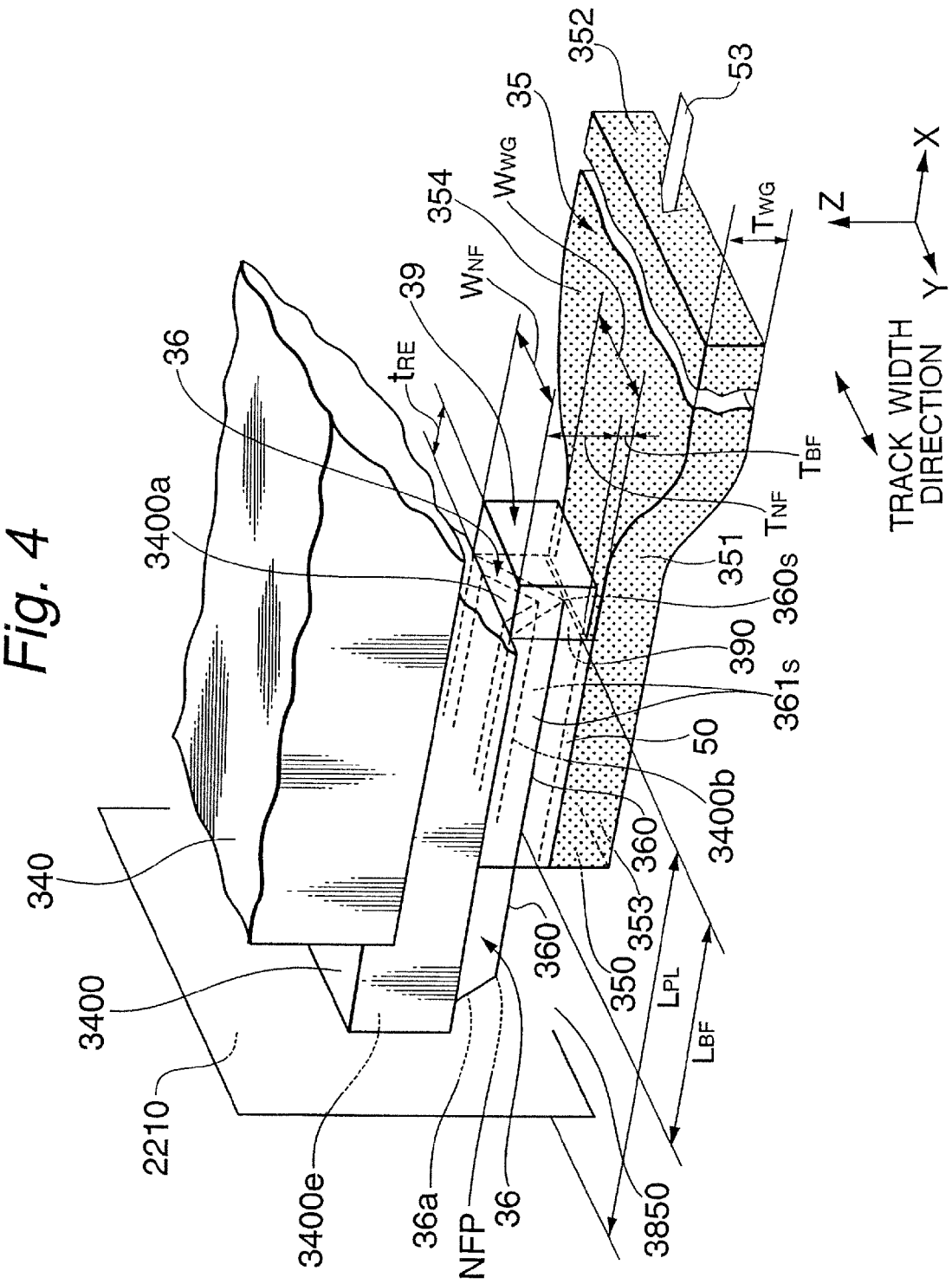
FIG. 4 shows a perspective view schematically illustrating the configuration of a waveguide, a plasmon generator, a resonator mirror and a main magnetic pole.

FIG. 4 shows a perspective view schematically illustrating the configuration of the waveguide 35, the plasmon generator 36, the resonator mirror 39, and the main magnetic pole 3400. In the figure, the head end surface 2210 is positioned at the left side, the end surface 2210 including positions where write field and NF-light are emitted toward the magnetic recording medium.

Referring to FIG. 4, a plasmon resonating optical system 31 are provided with: a waveguide 35 that propagates laser light 53 for generating NF-light; a buffering portion 50 sandwiched between the waveguide 35 and the propagation surface (lower surface) 361s of the plasmon generator 36; a plasmon generator 36 that couples with laser light (waveguide light) 53 in a surface plasmon mode, excites surface plasmon, propagates the surface plasmon on the propagation edge 360, and then generates NF-light from the NF-light generating end surface 36a provided on the head end surface 2210 side; and a resonator mirror 39 that reflects the propagating surface plasmon.

At least a portion of the propagation edge 360 of the plasmon generator 36 is opposed to the waveguide 35 with the buffering portion 50 sandwiched therebetween. The propagation edge 360 extends from the end 360b opposite to the head end surface 2210 to the vertex NFP of the NF-light generating end surface 36a, and propagates surface plasmon excited by laser light (waveguide light) 53 to the NF-light generating end surface 36a.

The resonator mirror 39 is provided on the side opposite to the NF-light generating end surface 36a (on +X side) from the plasmon generator 36. During data writing, the resonator mirror 39 functions as one mirror in a resonator in which the other mirror is a portion of the surface of the magnetic recording layer of the magnetic disk 10 (FIG. 1a) that faces a vertex NFP (of the NF-light generating end surface 36a). That is, the resonator mirror 39 and the portion of the surface of the magnetic recording layer of the magnetic disk 10 form a Fabry-Perot resonator with the plasmon generator 36 between them.

A Fabry-Perot resonator is a type of resonator in which reflecting mirrors are provided at both ends of a path along which light (electromagnetic field) propagates, in such a manner that the reflecting surfaces of the reflecting mirrors face each other. For example, a laser equipment can be formed by providing a laser medium in the Fabry-Perot resonator. The amplitude of laser light generated by stimulated emission increases as the laser light is reflected in the Fabry-Perot resonator and travels back and forth in the laser medium. In particular, when the laser light resonates in the Fabry-Perot resonator to form a standing wave, the amplitude of the laser light increases. As a result, laser light with a higher intensity can be obtained.

In FIG. 4, the amplitude of excited surface plasmon (electromagnetic field) increases as the surface plasmon is reflected by the resonator mirror 39 and a portion of the surface of the magnetic recording layer of the magnetic disk 10 and travel back and forth along the propagation edge 360 of the plasmon generator 36 in −X and +X directions. In particular, excited surface plasmon resonates in the resonator formed by the resonator mirror 39 and a portion of the surface of the magnetic recording layer to form a standing wave to increase their amplitude if a length $L_{PL}$ of the plasmon generator 36 is chosen that satisfies the expression $$(\lambda_0 \cdot m/(2 \cdot n_{EFFPG})) - 0.275 \cdot (\lambda_0/(2 \cdot n_{EFFPG})) \leq L_{PL} \leq (\lambda_0 \cdot m/(2 \cdot n_{EFFPG})) + 0.275 \cdot (\lambda_0/(2 \cdot n_{EFFPG})). \quad (1)$$

Here, $\lambda_0$ is the wavelength of laser light 53 in a vacuum, $n_{EFFPG}$ is the effective refractive index when the surface plasmon propagates along the propagation edge 360 of the plasmon generator 36 in a surface plasmon mode, and m (a natural number) is the number of anti-nodes of the standing wave.

With the amplification, a higher degree of light use efficiency in a plasmon resonating optical system 31 can be achieved without needing to increase the length $L_{PL}$ of the plasmon generator 36. Actually, one method to increase the light use efficiency is to increase the length $L_{PL}$ of the plasmon generator 36 in order to allow waveguide light 53 to sufficiently strongly couple to the plasmon generator 36 in a surface plasmon mode. However, in that case, more surface plasmon excited is absorbed in the plasmon generator 36 made of metal as the surface plasmon propagates along the longer propagation path of the plasmon generator 36. As a result, the amount of surface plasmon which generates NF-light decreases, possibly reducing the light use efficiency. Furthermore, the temperature of the plasmon generator 36 which absorbed surface plasmon increases and the plasmon generator 36 might melt.

In contrast, in the plasmon resonating optical system 31 according to the present invention, higher light use efficiency can be achieved by using the resonator structure to amplify excited surface plasmon, instead of increasing the length $L_{PL}$ of the plasmon generator 36. In the meanwhile, absorption of excited surface plasmon absorbed in the plasmon generator 36 is kept down and consequently overheating of the plasmon generator 36 is prevented. As a result, NF-light having a very high light density can be generated from the NF-light generating end surface 36a of the plasmon generator 36. In fact, a practical example, which will be described later, has shown that a plasmon generator 36 with a length $L_{PL}$ of 0.8 μm can generate NF-light having a light density that is 24% greater than that of NF-light generated in an optical system that includes a plasmon generator 36 with a length $L_{PL}$ of 1.2 to 1.3 μm and does not include a resonator structure.

The vertex NFP, which is a point generating NF-light, faces the magnetic disk 10 at a distance of $d_{FH}$ (FIG. 6) that is equivalent to a flying height during data writing. Therefore, to be precise, the distance $d_{FH}$ needs to be reflected in the relationship expressed by Expression (1) given above. However, the distance $d_{FH}$ is as small as of the order of several nm, for example, which is several orders of magnitude smaller than the length $L_{PL}$ of the plasmon generator 36. Therefore, Expression (1) that does not include the distance $d_{FH}$ can be practically used as the conditional expression for generating a standing wave. On the other hand, an end 360b of the propagation edge 360 preferably abuts on a reflecting surface 390 of the resonator mirror 39 as illustrated in FIG. 4. With this arrangement, surface plasmon keeps propagating along the propagation edge 360 while being reflected by the reflecting surface 390. Therefore, propagation loss due to deflection of surface plasmon from the propagation edge 360 can be prevented.

Further, the main magnetic pole 3400 is in surface contact with a surface portion of the plasmon generator 36 that does not include the propagation edge 360. The surface portion is a portion of the surface located opposite to the propagation surface (lower surface) 361s that includes the propagation edge 360 of the plasmon generator 36. Thus, the main magnetic pole 3400 and the plasmon propagation edge 360 are surely separated from each other with a predetermined distance. As a result, there can be avoided significant reduction in light use efficiency of the plasmon resonating optical system 31 due to much absorption of surface plasmon propagating along the propagation edge 360 into the main magnetic pole 3400 made of a magnetic metal. Accordingly, surface plasmon excited is hardly absorbed in the main magnetic pole 3400 and can concentrate on and propagate along the propagation edge 360. As a result, surface plasmon reliably reaches the vertex NFP that is one vertex of the NF-light generating end surface 36a and is an end of the propagation edge 360. Thus the vertex NFP becomes the NF-light generating point of the plasmon generator 36. The corner of the propagation edge 360 is rounded in order to prevent surface plasmon from deflecting from the propagation edge 360 to reduce the light use efficiency. It is known that the radius of curvature of the rounded corner in the range of 6.25 to 20 nm is preferable.

Also in FIG. 4, the main magnetic pole 3400 includes a protrusion 3400a that protrudes toward the waveguide 35. The plasmon generator 36 covers at least a part on the head end surface 2210 side of a magnetic pole edge 3400b that is the protruding end of the protrusion 3400a. The plasmon generator 36 has a cross section shaped like a letter V in the embodiment in FIG. 4. The end WFP of the magnetic pole edge 3400b on the head end surface 2210 side is a write field generating point, as will be shown in FIG. 5 later. By configuring the main magnetic pole 3400 and the plasmon generator 36 in this way, the distance $D_{WN}$ (FIG. 5) between the write field generating point WFP and the NF-light generating point NFP at the end of the propagation edge 360 can be set to a desired small value through adjustment of the thickness of the plasmon generator 36 in Z-axis direction.

Furthermore, the plasmon generator 36 is in surface contact with the main magnetic pole 3400. Accordingly, heat generated from the plasmon generator 36 when generating NF-light can be partially dissipated into the main magnetic pole 3400. That is, the main magnetic pole 3400 can be used as a heatsink. As a result, excessive rise of temperature of the plasmon generator 36 can be suppressed, and an unnecessary protrusion of the NF-light generating end surface 36a and a substantial reduction in light use efficiency in the plasmon generator 36 can be avoided. Furthermore, the plasmon generator 36 can be formed of a metal. Therefore, since the plasmon generator 36 is in contact with the main magnetic pole 3400 also made of a metal, the plasmon generator 36 is not electrically isolated and thus detrimental effects of electrostatic discharge (ESD) from the plasmon generator 36 can be inhibited.

A portion sandwiched between a portion of side surface (upper surface) 354 of the waveguide 35 and a portion of propagation surface (lower surface) 361s including the propagation edge 360 of the plasmon generator 36 forms a buffering portion 50. That is, the propagation edge 360 is covered with the buffering portion 50. The buffering portion 50 couples waveguide light 53 to the plasmon generator 36 in a surface plasmon mode. The propagation edge 360 propagates surface plasmon, which is excited by the waveguide light 53 via the buffering portion 50, to the NF-light generating end surface 36a. The term "side surfaces" of the waveguide 35 as used herein refers to the end surfaces 351, 353, and 354 among the surrounding end surfaces of the waveguide 35 except the end surface 350 on the head end surface 2210 side and the rear end surface 352 opposite to the end surface 350. The side surfaces of the waveguide 35 are capable of totally reflecting waveguide light 53 propagating through the waveguide 35 that acts as a core and the surrounding overcoat layer 38 (FIG. 2) that acts as a clad. The buffering portion 50 may be a portion of the overcoat layer 38, or may be a different layer provided in addition to the overcoat layer 38.

The plasmon generator 36 is preferably made of Au (gold), an alloy primarily containing Au, Ag (silver), or an alloy primarily containing Ag. The Ag alloy preferably contains at least one element selected from the group consisting of a palladium (Pd), gold (Au), copper (Cu), ruthenium (Ru), rhodium (Rh), and iridium (Ir). By forming the surface plasmon generator 36 from such an Ag alloy, the NF-light emission efficiency second to Ag, which is a material having theoretically the highest NF-light emission efficiency, can be achieved and, in addition, defects such as cracking and chipping of the propagation edge 360 can be sufficiently minimized. The width $W_{NF}$ in the track width direction (in Y-axis direction) and the thickness $T_{NF}$ (in Z-axis direction) of the plasmon generator 36 are preferably smaller than the wavelength of laser light 53.

The resonator mirror 39 can be made of metal such as Ag or Cu so that surface plasmon (electromagnetic field) propagating along the plasmon generator 36 is reflected by the reflecting surface 390 at a high reflectivity. The thickness $t_{RE}$ (in X-axis direction) of the resonator mirror 39 is chosen to be sufficiently large, for example in the range from 5 to 30 nm, to provide a sufficiently high reflectivity.

Further, the side surfaces of the waveguide 35: the upper surface 354; the lower surface 353; and both the side surfaces 351 in the track width direction (Y-axis direction) have a surface contact with the overcoat layer 38 (FIG. 2), that is, the insulating layers 384 and 385 (FIG. 3), except the portion having a surface contact with the buffering portion 50. Here, the waveguide 35 is formed of a dielectric material with a refractive index $n_{WG}$ higher than a refractive index $n_{OC}$ of the constituent material of the overcoat layer 38. For example, in the case that the wavelength of laser light is 600 nm and the overcoat layer 38 is formed of $Al_2O_3$ (n=1.63), the waveguide 35 can be formed of, for example, $SiO_xN_y$ (n=1.7-1.85), $TaO_X$ (n=2.16), $NbO_X$ (n=2.33), or $TiO_X$ (n=2.3-2.55). This material structure of the waveguide 35 enables the propagation loss of laser light 53 to be reduced due to the excellent optical characteristics of the constituent material. Further, the existence of the waveguide 35 as a core and the overcoat layer 38 as a clad can provide total reflection conditions in all the side surfaces. As a result, more amount of laser light 53 (waveguide light) can reach the position of the buffering portion 50, which improves the propagation efficiency of the waveguide 35. Meanwhile, in the present embodiment, a portion of propagation edge 360 that is not opposed to the waveguide 35 (buffering portion 50) may be covered with the constituent material of the overcoat layer 38 having refractive index $n_{OC}$, for example, with a portion 3850 of the insulating layer 385.

The waveguide 35 may have a shape with a constant width in the track width direction (Y-axis direction), or as shown in FIG. 4, may have a portion on the head end surface 2210 side, which has a narrower width in the track width direction (Y-axis direction). The width $W_{WG}$ in the track width direction (Y-axis direction) of a portion of the waveguide 35 on the head end surface 2210 side may be, for example, in the range approximately from 0.3 to 100 μm, and the thickness $T_{WG}$ (in Z-axis direction) may be, for example, in the range approximately from 0.1 to 4 μm.

The buffering portion 50 is formed of a dielectric material having a refractive index $n_{BF}$ lower than the refractive index $n_{WG}$ of the waveguide 35. For example, when the wavelength of laser light is 600 nm and the waveguide 35 is formed of TaO$_X$ (n=2.16), the buffering portion 50 may be formed of SiO$_2$ (n=1.46) or Al$_2$O$_3$ (n=1.63). In these cases, the buffering portion 50 can be a portion of the overcoat layer 38 (FIG. 2) serving as a clad made of SiO$_2$ or Al$_2$O$_3$. The thickness T$_{BF}$ (in Z-axis direction) of the buffering portion 50 is preferably in the range from 10 to 200 nm. The use of the resonator mirror 39 according to the present invention can also reduce the length L$_{BF}$ (in X-axis direction) of the buffering portion 50 provided between the upper surface (side surface) 354 of the waveguide 35 and the propagation surface 361s (propagation edge 360) as compared with that of a buffer portion in the absence of the resonator mirror 39. In practical examples, which will be described later, the length L$_{BF}$ of the buffering portion 50 is equal to the length L$_{PL}$ of the plasmon generator 36. The length L$_{BF}$ and thickness T$_{BF}$ of the buffering portion 50 are important parameters for achieving appropriate excitation and propagation of surface plasmon.

FIG. 5 shows a plan view illustrating shapes of the end surfaces of the waveguide 35, the plasmon generator 36 and the electromagnetic transducer 34 on the head end surface 2210 or in its vicinity.

As shown in FIG. 5, in the electromagnetic transducer 34, the main magnetic pole 3400 and the lower shield 3450 reach the head end surface 2210. The end surface 3400e of the main magnetic pole 3400 on the head end surface 2210 has a combined shape of: a trailing-side portion having, for example, a substantially rectangular, square, or trapezoidal shape; and a end surface 3400ae of the protrusion 3400a that protrudes toward the waveguide 35. The vertex WFP most on the leading side in the end surface 3400e is closest to the lower shield 3450, and therefore magnetic field is most concentrated at the vertex WFP; thus the vertex WFP becomes a write-field generating point. Since the main magnetic pole 3400 has such a small write-field generating point, a minute write field that meets higher recording density can be generated.

Further, the NF-light generating end surface 36a of the plasmon generator 36 at the head end surface 2210 is shaped like a letter V having a predetermined thickness. The end surface 3400e of the main magnetic pole 3400 is in contact with the NF-light generating end surface 36a. The locations of the end surface 3400e and the end surface 36e separate the write field generating point WFP from the NF-light generating point NFP, which is the end of the propagation edge 360 on the head end surface 2210 side, by a distance D$_{WN}$ equal to the thickness of the plasmon generator 36 (the NF-light generating end surface 36a) in Z-axis direction. Accordingly, by controlling the thickness of the NF-light generating end surface 36a to an appropriate small value, the write field generating point WFP and the NF-light generating point NFP can be located sufficiently close to each other. As a result, the magnetic field gradient of write field generated from the main magnetic pole 3400 can be increased to a sufficient value in a position on the magnetic disk 10 that is irradiated with NF-light, and therefore thermally-assisted magnetic recording with high recording density can be performed. It is known in manufacturing that the distance D$_{WN}$ between the points WFP and NFP in the range of 30 nm to 100 nm, inclusive, is preferable in order to provide a sufficiently high magnetic field gradient of write field in a position on the magnetic recording layer of a magnetic disk 10 that is irradiated with NF-light to enable thermally-assisted magnetic recording with high recording density.

Separation between a part of the main magnetic pole 3400 that is not protruding (a part of the main magnetic pole 3400 excluding the protrusion 3400a) and the waveguide 35 by an appropriate distance D$_{MW}$ can avoid absorption of a part of waveguide light into the main magnetic pole 3400 made of metal and therefore reduction in the amount of light to be converted to NF-light. The distance D$_{MW}$ is $$D_{MW} = t_{3400a} + D_{WN} + T_{BF} \quad (2)$$

where t$_{3400a}$ is the thickness of the protrusion 3400a of the main magnetic pole 3400 in Z-axis direction and T$_{BF}$ is the distance between the NF-light generating point NFP and the waveguide 35 in Z-axis direction, that is, the thickness of the buffering portion 50 (FIG. 4). The thickness T$_{BF}$ is chosen to be a predetermined value that results in appropriate excitation and propagation of surface plasmon. As will be apparent from Expression (1), by choosing a sufficiently large thickness t$_{3400a}$, an appropriate distance D$_{MW}$ can be provided while keeping the distance D$_{WM}$ between the points WFP and NFP sufficiently small.

As has been described above, in a thermally-assisted magnetic recording head according to the present invention, the distance D$_{WN}$ on the head end surface 2210 between the point NFP that applies heat during writing and the point WFP that writes data can be set to a sufficiently small value. Accordingly, write field that has a sufficiently high magnetic field gradient can be applied to a sufficiently heated portion of the magnetic recording layer of a magnetic disk. Consequently, considerably small recording bits that enable high recording density can be formed.

Figure 6:
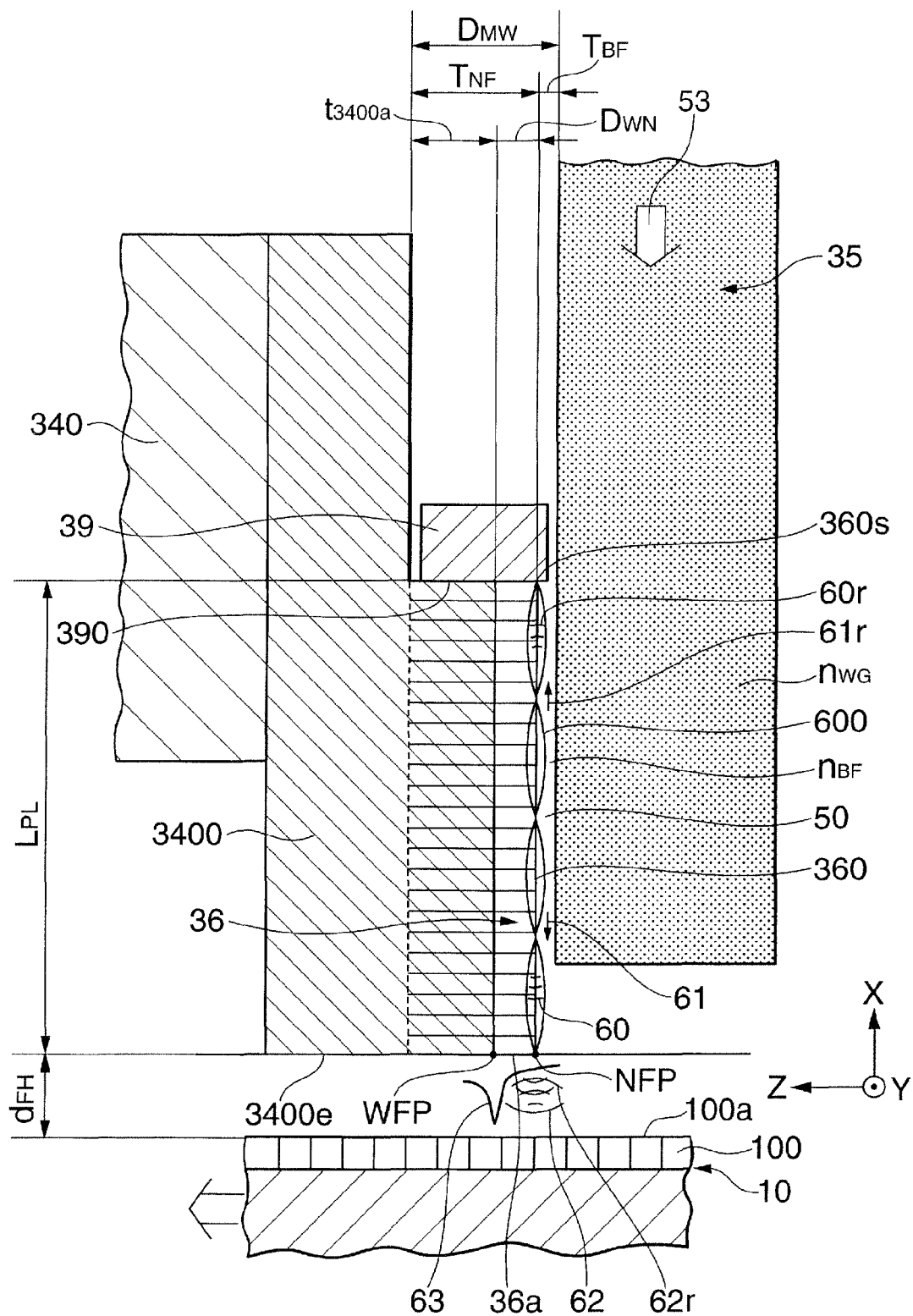
FIG. 6 shows a schematic view for explaining thermally-assisted magnetic recording utilizing a surface plasmon mode according to the present invention.

FIG. 6 shows a schematic view for explaining the thermally-assisted magnetic recording utilizing a surface plasmon mode according to the present invention.

Referring to FIG. 6, when the electromagnetic transducer 34 writes data onto the magnetic recording layer of the magnetic disk 10, first, laser light 53 emitted from the laser diode 40 of the light source unit 23 propagates through the waveguide 35. Next, the laser light (waveguide light) 53, which has advanced to near the buffering portion 50, couples with the optical configuration including the waveguide 35 with a refractive index n$_{WG}$, the buffering portion 50 with a refractive index n$_{BF}$ and the plasmon generator 36 made of a conductive material such as a metal, and induces a surface plasmon mode on the propagation edge 360 of the plasmon generator 36. That is, the waveguide light couples with the plasmon generator 36 in a surface plasmon mode.

Actually, evanescent light is excited within the buffering portion 50 based on the optical boundary condition between the waveguide 35 as a core and the buffering portion 50. Then, the evanescent light couples with the fluctuation of electric charge excited on the metal surface (propagation edge 360) of the plasmon generator 36, and induces a surface plasmon mode, and thus surface plasmon is excited. To be exact, there excited is surface plasmon polariton in this system because surface plasmon as elementary excitation is coupled with an electromagnetic wave. However, the surface plasmon polariton will be hereinafter referred to as surface plasmon for short. The above-described surface plasmon mode can be induced by setting the refractive index n$_{BF}$ of the buffering portion 50 to be lower than the refractive index n$_{WG}$ of the waveguide 35 (N$_{BF}$<N$_{WG}$) and by appropriately choosing: the length (in X-axis direction) of the buffering portion 50, that is, the length L$_{BF}$ of the coupling portion between the waveguide 35 and the plasmon generator 36; and the thickness T$_{BF}$ (in Z-axis direction) of the buffering portion 50.

Here, the propagation edge 360 of the plasmon generator 36 located in the propagation surface (lower surface) 361s that faces the waveguide 35 is closest to the waveguide 35, and is angled so that electric field readily concentrate on the propagation edge 360. Accordingly, surface plasmon is excited most strongly on the propagation edge 360. The excited surface plasmon 60 propagates mainly along the propagation edge 360 in the direction indicated by arrow 61 to the vertex NFP of the NF-light generating end surface 36a, which is a part of the head end surface 2210. As a result, NF-light 62 is generated from the vertex NFP.

Part of the NF-light 62 is reflected by the surface 100a of the magnetic recording layer 100 of the magnetic disk 10 back to the propagation edge 360 as an electromagnetic wave 62r and propagates along the propagation edge 360 in the direction indicated by arrow 61r as surface plasmon 60r. The surface plasmon 60r is reflected by the reflecting surface 390 of the resonator mirror 39 and propagates again along the propagation edge 360 in the direction indicated by arrow 61 as surface plasmon 60. In this way, excited surface plasmon (electromagnetic field) is reflected by the resonator mirror 39 and the surface 100a of the magnetic recording layer 100 of the magnetic disk 10 and travels back and forth along the propagation edge 360 in the direction indicated by arrows 61 and 61r. As a result, the intensity of the surface plasmon is amplified. In particular, by choosing the length $L_{PL}$ of the plasmon generator 36 in the range of $\pm 0.275 \cdot \lambda_0/(2 \cdot n_{EFFPG})$ from $\lambda_0 \cdot m/(2 \cdot n_{EFFPG})$ around $\lambda_0 \cdot m/(2 \cdot n_{EFFPG})$ as given in Expression (1), excited surface plasmon resonates in the resonator formed by the resonator mirror 39 and the surface 100a of the magnetic recording layer 100 to form a standing wave 600, as will be described later with respect to practical examples. In consequence, the amplitude of the surface plasmon increases. Thus, the light density of NF-light 62 increases and the magnetic recording layer 100 can be irradiated with NF-light having sufficient intensity and small spot size. With the irradiation, the anisotropic magnetic field (coercivity) in a small domain irradiated in the magnetic recording layer 100 is reduced to a sufficient value that allows data to be written. Immediately after that, write field 63 generated from the vertex WFP of the end surface 3400e of the main magnetic pole 3400 is applied to the domain to write data. In this way, good thermally-assisted magnetic recording can be performed.

In a conventional case in which a NF-light generator provided on the end surface of a head is directly irradiated with the laser light propagating through a waveguide, most of the irradiating laser light has been converted into thermal energy within the NF-light generator. In this case, the size of the NF-light generator has been set smaller than the wavelength of the laser light, and its volume is very small. Therefore, the NF-light generator has been brought to a very high temperature, for example, 500° C. (degrees Celsius) due to the thermal energy. As a result, there has been a problem that the end of a read head element, which reaches the opposed-to-medium surface, becomes relatively far apart from the magnetic disk due to the thermal expansion of the generator, which makes it difficult to properly read servo signals during recording operations. Further, there has been another problem that the light use efficiency is degraded because thermal fluctuation of free electrons increases in the NF-light generator.

On the contrary, in the thermally-assisted magnetic recording according to the present invention, a surface plasmon mode is used, and NF-light 62 is generated by propagating surface plasmon 60 and 60r along the propagation edge 360. This brings the temperature at the NF-light generating end surface 36a to, for example, about 100° C. during the emission of NF-light, the temperature being drastically reduced compared to the conventional. Thus, this reduction of temperature allows the protrusion of the NF-light generating end surface 36a toward the magnetic disk 10 to be suppressed; thereby favorable thermally-assisted magnetic recording can be achieved.

Figure 7A:
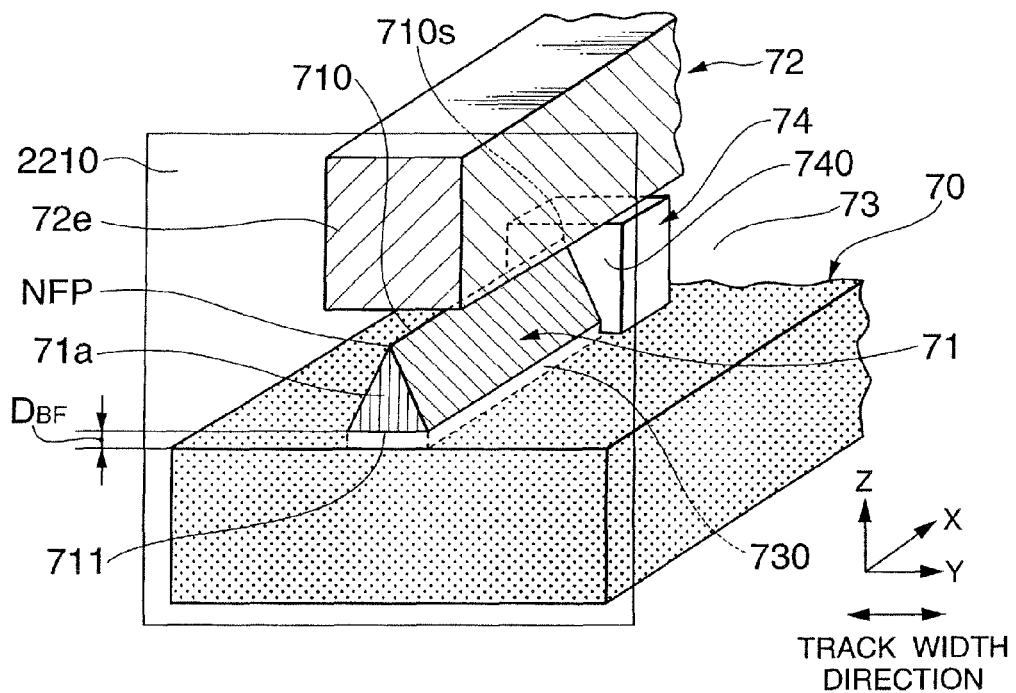
FIGS. 7a to 7d show perspective views illustrating various embodiments of the plasmon resonating optical system and the main magnetic pole according to the present invention.
Figure 7B:
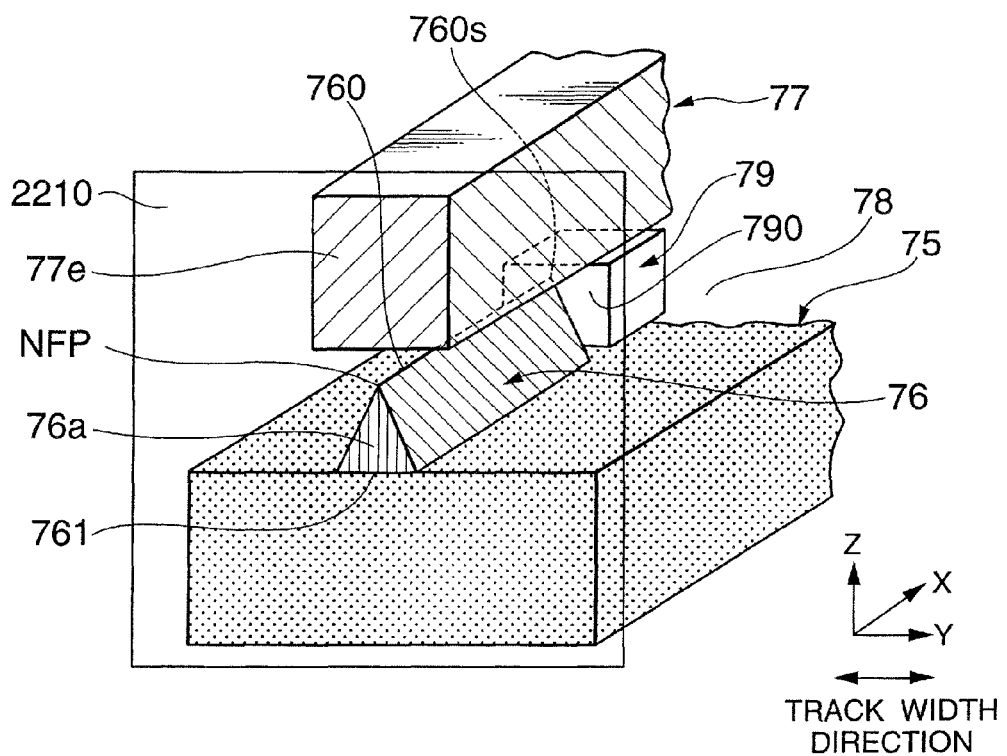
Figure 7C:
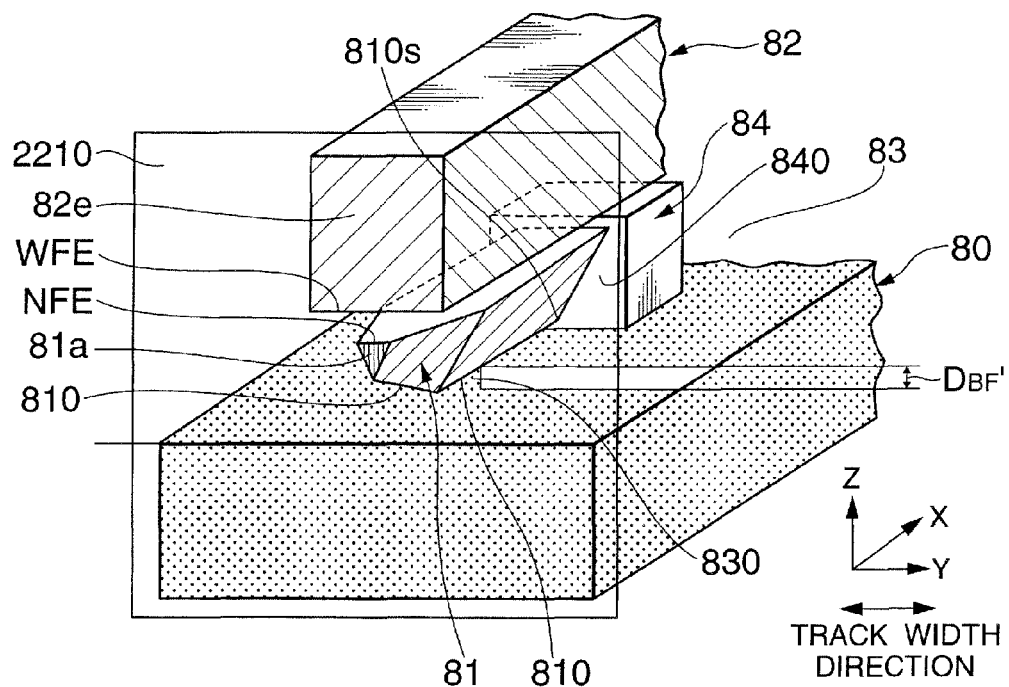
Figure 7D:
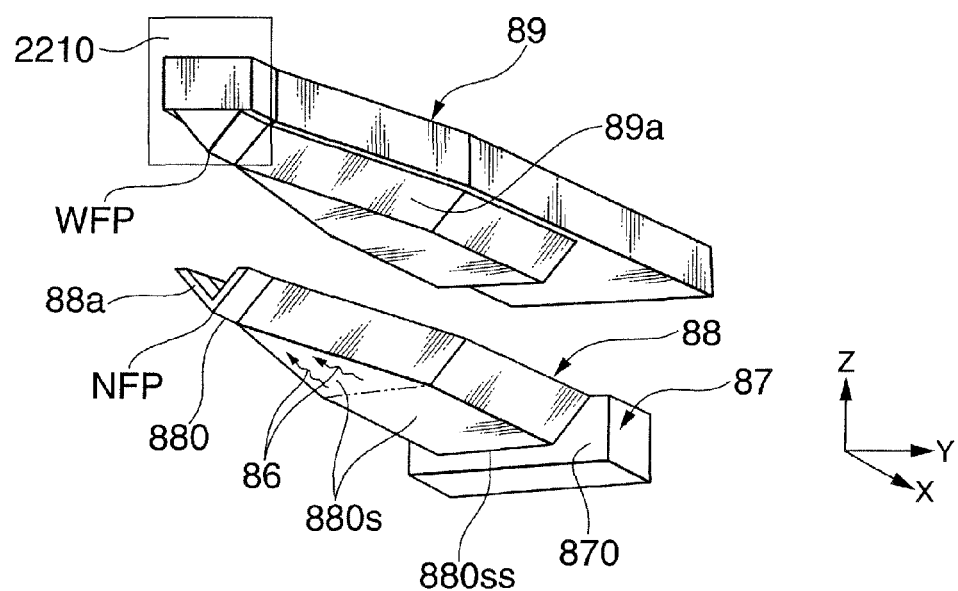

FIGS. 7a to 7d show perspective views illustrating various embodiments of the plasmon resonating optical system and the main magnetic pole according to the present invention. Here, FIG. 7d is a perspective view of a plasmon generator 88 and a main magnetic pole 89 depicted as being separated from each other.

Referring to FIG. 7a, a surface plasmon generator 71 is provided between a waveguide 70 and a main magnetic pole 72, is covered with an insulating layer 73, and is separated from both of the waveguide 70 and the main magnetic pole 72. The plasmon generator 71 has an opposed-to-waveguide surface 711 that is opposed to the waveguide 70 and is separated by an insulating layer portion 730 with a predetermined distance $D_{BF}$ from the waveguide 70. A propagation edge 710 of the plasmon generator 71 is opposite to the opposed-to-waveguide surface 711. In the configuration in FIG. 7a as described above, the waveguide 70, the insulating layer portion 730, and the surface plasmon generator 71 form an Otto configuration which is one configuration of an optical system that uses evanescent light to excite surface plasmon. In the Otto configuration, a first dielectric region, a second dielectric region having a lower refractive index than the first dielectric region, and a metal region adjoin each other and are arranged in this order from the laser light incident side.

In the embodiment in FIG. 7a, laser light (waveguide light) that traveled close to the opposed-to-waveguide surface 711 of the surface plasmon generator 71 couples to an optical structure formed by the waveguide 70 having a refractive index $n_{WG}$, a buffering portion (the insulating layer portion 730 and the insulating layer 73 that covers the plasmon generator 71) having a refractive index $n_{OC}$ ($n_{OC} < n_{WG}$), and the surface plasmon generator 71 made of a conductive material such as metal, to induce a surface plasmon mode on the surface plasmon generator 71. Specifically, light seeping from the waveguide 70 couples with a fluctuation of charge excited at the surface of the surface plasmon generator 71 to induce a surface plasmon mode, thereby exciting surface plasmon along the propagation edge 710.

Further, referring to FIG. 7a, a resonator mirror 74 is provided on the side of the plasmon generator 71 that is opposite to the NF-light generating end surface 71a (on +X side). The resonator mirror 74 reflects surface plasmon excited at the propagation edge 710. Here, the end 710s of the propagation edge 710 that is opposite to the NF-ight generating end surface 71a (NFP) preferably abuts on the reflecting surface 740 of the resonator mirror 74. With the configuration described above, surface plasmon (electromagnetic field) propagating along the propagation edge 710 resonate between the resonator mirror 74 and the surface of the magnetic recording layer of the magnetic disk 10 (FIG. 1a) to form a standing wave during data writing. As a result, NF-light having a very high light density can be generated from the NF-light generating end surface 71a (NFP) of the plasmon generator 71. Consequently, good thermally-assisted magnetic recording can be performed in the embodiment in FIG. 7a as well.

According to an embodiment in FIG. 7b, a surface plasmon generator 76 is provided between a waveguide 75 and a main magnetic pole 77 and is covered with an insulating layer 78. The surface plasmon generator 76 is in contact with the waveguide 75 and is separated from the main magnetic pole 77. The plasmon generator 76 has an contact-to-waveguide surface 761 that is in surface contact with the waveguide 75. The propagation edge 760 of the plasmon generator 76 is opposite to the contact-to-waveguide surface 761. In the configuration illustrated in FIG. 7b, the waveguide 75, the surface plasmon generator 76, and the insulating layer 78 form a Kretschmann configuration, which is a configuration of an optical system that uses evanescent light to excite surface plasmon. In the Kretschmann configuration, a first dielectric region, a metal region, and a second dielectric region having a refractive index lower than the first dielectric region adjoin each other and are arranged in this order from the laser light incident side.

In the embodiment in FIG. 7b, laser light (waveguide light) that traveled close to the contact-to-waveguide surface 761 of the surface plasmon generator 76 couples to an optical structure formed by the waveguide 75 having a refractive index $N_{WG}$, the surface plasmon generator 76 made of a conductive material such as metal, a buffering portion (the insulating layer 78 that covers the generator 76) having a refractive index $n_{OC}$ ($n_{OC} < n_{WG}$), to induce a surface plasmon mode on the surface plasmon generator 76. Specifically, light seeping from the waveguide 75 couples with a fluctuation of charge excited at the surface of the surface plasmon generator 76 to induce a surface plasmon mode, thereby exciting surface plasmon along the propagation edge 760.

Further, referring to FIG. 7b, a resonator mirror 79 is provided on the side of the plasmon generator 76 that is opposite to the NF-light generating end surface 76a (on +X side). The resonator mirror 79 reflects surface plasmon excited at the propagation edge 760. Here, the end 760s of the propagation edge 760 that is opposite to the NF-light generating end surface 76a (NFP) preferably abuts on the reflecting surface 790 of the resonator mirror 79. With the configuration described above, surface plasmon (electromagnetic field) propagating along the propagation edge 760 resonate between the resonator mirror 79 and the surface of the magnetic recording layer of the magnetic disk 10 (FIG. 1a) to form a standing wave during data writing. As a result, NF-light having a very high light density can be generated from the NF-light generating end surface 76a (NFP) of the plasmon generator 76. Consequently, good thermally-assisted magnetic recording can be performed in the embodiment in FIG. 7b as well.

According to an embodiment in FIG. 7c, a surface plasmon generator 81 is provided between a waveguide 80 and a main magnetic pole 82, is covered with an insulating layer 83, and is separated from both of the waveguide 80 and the main magnetic pole 82. At least a portion of the propagation edge 810 of the plasmon generator 81 is opposed to the waveguide 80 at a predetermined distance $D_{BF}'$ from the waveguide 80 with an insulating layer portion 830 between them.

In the configuration in FIG. 7c described above, the waveguide 80, the insulating layer portion 830 located between the waveguide 80 and the surface plasmon generator 81, and the surface plasmon generator 81 form an Otto configuration, like the embodiment illustrated in FIG. 7a. Laser light (waveguide light) that traveled close to the propagation edge 810 of the surface plasmon generator 81 couples to an optical structure formed by the waveguide 80 having a refractive index $n_{WG}$, a buffering portion (the insulating layer portion 830 and the insulating layer 83 that covers the generator 81) having a refractive index $n_{OC}$ ($n_{OC} < n_{WG}$), and the surface plasmon generator 81 made of a conductive material such as metal, to induce a surface plasmon mode on the propagation edge 810 of the surface plasmon generator 81. Specifically, light seeping from the waveguide 80 couples with a fluctuation of charge excited at the propagation edge 810, which is closest to the waveguide 80 and is angled so that electric field readily concentrate on the propagation edge 810, to induce a surface plasmon mode, thereby exciting surface plasmon along the propagation edge 810.

Referring to FIG. 7c, a resonator mirror 84 is provided on the side of the plasmon generator 81 that is opposite to the NF-light generating end surface 81a (on +X side). The resonator mirror 84 reflects surface plasmon excited at the propagation edge 810. Here, the end 810s of the propagation edge 810 that is opposite to the NF-light generating end surface 81a (NFP) preferably abuts on the reflecting surface 840 of the resonator mirror 84. With the configuration described above, surface plasmon (electromagnetic field) propagating along the propagation edge 810 resonate between the resonator mirror 84 and the surface of the magnetic recording layer of the magnetic disk 10 (FIG. 1a) to form a standing wave during data writing. As a result, NF-light having a very high light density can be generated from the NF-light generating end surface 81a of the plasmon generator 81. Consequently, good thermally-assisted magnetic recording can be performed in the embodiment in FIG. 7c as well.

By adjusting the shape and size of the NF-light generating end surface 81a, NF-light can be generated, in a concentrated manner, from the edge NFE of the plasmon generator 81 on the side of the end surface 82e of the main magnetic pole 82. Consequently, the edge NFE where NF-light is generated and the edge WFE of the end surface 82e of the main magnetic pole 82 where a write field is generated can be located sufficiently close to each other. As a result, write field having a sufficiently large gradient can be applied to a sufficiently heated domain in the magnetic recording layer of the magnetic disk 10 and therefore stable thermally-assisted writing operation can be reliably performed.

According to an embodiment in FIG. 7d, a plasmon generator 88 has the shape of a tray with a width in the track width direction (Y-axis direction) that tapers toward the head end surface 2210. A protrusion 89a of a main magnetic pole 89 is tightly fitted into the tray-shaped portion of the plasmon generator 88 without clearance. Accordingly, the main magnetic pole 89 is in contact with the plasmon generator 88 in such a manner that the main magnetic pole 89 is in surface-contact with the inner walls of the tray of the plasmon generator 88.

The plasmon generator 88 further includes a propagation surface 880s and a propagation edge 880 on the side facing a waveguide. The propagation edge 880 is coupled to an end of the tapered propagation surface 880s and extends to the head end surface 2210. Excited surface plasmon 86 propagates along the propagation surface 880s toward the head end surface 2210, is concentrated on the propagation edge 880, and propagates along the propagation edge 880 to an NF-light generating point NFP.

Further, referring to FIG. 7d, a resonator mirror 87 is provided on the side of the plasmon generator 88 that is opposite from the NF-light generating end surface 88a (on +X side). The resonator mirror 87 reflects surface plasmon excited at the propagation surface 880s. Here, the end 880ss of the propagation surface 880s that is opposite to the NF-light generating end surface 88a (NFP) preferably abuts on the reflecting surface 870 of the resonator mirror 87. With the configuration described above, surface plasmon (electromagnetic field) propagating along the propagation surface 880s and the propagation edge 880 resonates between the resonator mirror 87 and the surface of the magnetic recording layer of the magnetic disk 10 (FIG. 1a) to form a standing wave during data writing. As a result, NF-light having a very high light density can be generated from the NF-light generating end surface 88a (NFP) of the plasmon generator 88. Consequently, good thermally-assisted magnetic recording can be performed in the embodiment in FIG. 7d as well.

Practical Examples

Practical examples will be described below. In the Practical examples, generation of NF-light in a plasmon resonating optical system of a thermally-assisted magnetic recording head according to the present invention was analyzed by simulation.

Figure 8:
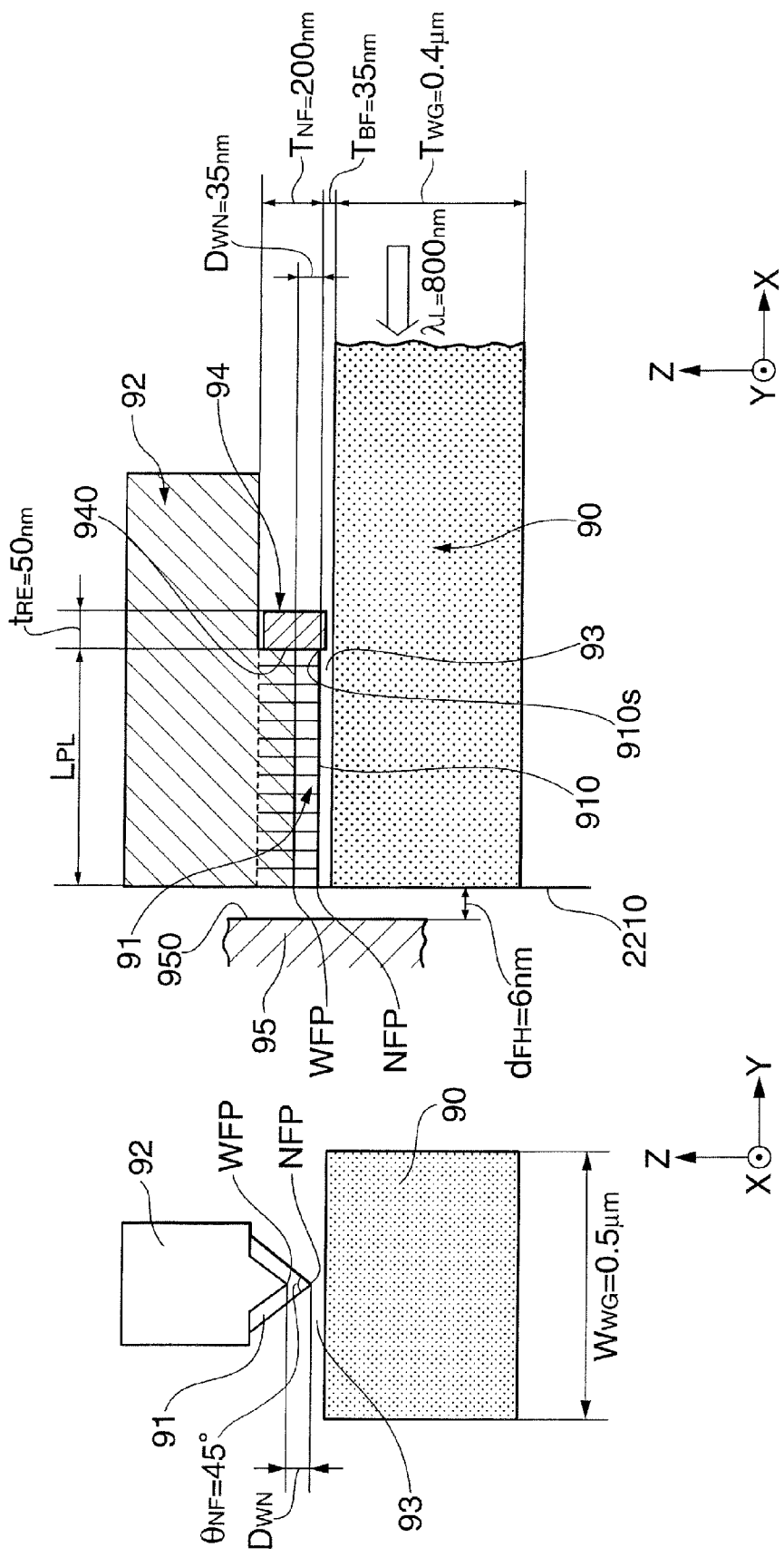
FIG. 8 shows a schematic view illustrating a system on which the analytical simulation experiment was conducted as practical examples and the comparative examples.

The analytical simulation experiment was conducted by three-dimensional Finite-Difference Time-Domain (FDTD) method, which is electromagnetic field analysis technique. FIG. 8 shows a schematic view illustrating a system on which the analytical simulation experiment was conducted as practical examples and the comparative examples. As illustrated in FIG. 8, laser light incident on a waveguide 90 was a Gaussian beam having a wavelength $\lambda_L$ of 800 nm and transverse magnetic (TM) polarization (in which electric field of the laser light oscillates in the direction perpendicular to the surface of the layers of the waveguide 90, namely in Z-axis direction). The intensity $I_{IN}$ of the laser light was 1.0 $(V/m)^2$.

The waveguide 90 had a width $W_{WG}$ of 0.5 μm and a thickness $T_{WG}$ of 0.4 μm and was made of $TaO_x$ (with a refractive index $n_{WG}$=2.15). A surface plasmon generator 91 was made of Au and had a height $T_{NF}$ of 200 nm. The real part of the complex index of refraction of the Au was 0.2 and the imaginary part was 4.88. The vertex angle $\theta_{NF}$ at the NF-light generating point NFP on the head end surface 2210 of the surface plasmon generator 91 was 45 degrees (°). The radius of curvature of the propagation edge 910 was 10 nm. The distance $T_{BF}$ between the NF-light generating point NFP (the propagation edge 910) and the waveguide 90 was 35 nm. The main magnetic pole 92 was made of FeCo. The real part of the complex index of refraction of the FeCo was 3.08 and the imaginary part was 3.9. A protective layer 93 which covers the waveguide 90, the surface plasmon generator 91 and the main magnetic pole 92 and includes a buffering portion was made of $Al_2O_3$ (alumina with a refractive index $n_{BF}$=1.65).

The distance $D_{WN}$ between the NF-light generating point NFP of the surface plasmon generator 91 and the write field generating point WFP of the main magnetic pole 92 was 35 nm. The distance $D_{WN}$ was equivalent to the thickness of the surface plasmon generator 91 in Z-axis direction. In the analytical simulation experiment, the length $L_{PL}$ of the plasmon generator 91 in Z-axis direction was varied among 0.75 μm, 0.78 μm, 0.8 μm, 0.82 μm, and 0.87 μm. A resonator mirror 94 was provided on the side of the plasmon generator 91 that is opposite to the head end surface 2210 (NFP) (on +X side). Here, an end 910s of the propagation edge 910 abuts on a reflecting surface 940 of the resonator mirror 94. The resonator mirror 94 was made of Au and has a thickness $t_{RE}$ in X-axis direction of 50 nm. A magnetic recording medium 95 was provided in such a manner that the magnetic recording medium 95 faces the NF-light generating point NFP on the head end surface 2210. The magnetic recording medium 95 was made of CoCrPt. The distance d between the surface 950 of the magnetic recording medium 95 and the NFP in X-axis direction was 6 nm.

An analytical simulation experiment was conducted on an optical system of comparative examples which had the same configuration as the plasmon resonating optical system described above with the only difference being the absence of the resonator mirror 94. In the comparative examples, the length $L_{PL}$ of the plasmon generator 91 in Z-axis direction was varied among 0.8 μm, 1.1 μm, 1.2 μm, 1.3 μm, 1.4 μm and 1.5 μm.

Under the experimental conditions described above, the relationship between the length $L_{PL}$ of the plasmon generator 91 and the light density max$|E|^2$ of NF-light generated at the NF-light generating point NFP of the surface plasmon generator 91 was measured by simulation. Here, the light density max$|E|^2$ is the maximum value of the square of absolute value of an electric field component E in a spot of NF-light that was emitted from the NF-light generating point NFP and reached the magnetic recording medium 95 located at a distance of 6 nm from the NFP in -X direction.

Figure 9:
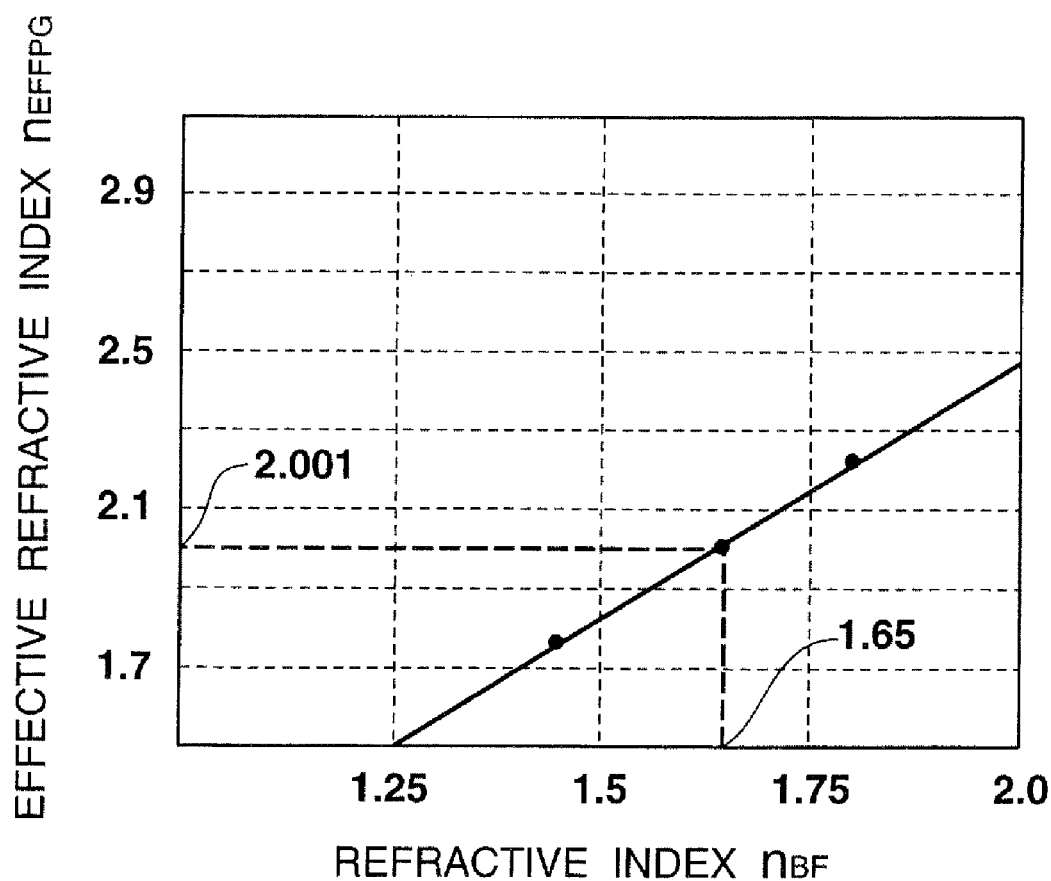
FIG. 9 shows a graph for obtaining effective refractive index $n_{EFFPG}$ when surface plasmon propagates along the propagation edge in a surface plasmon mode.
Figure 10:
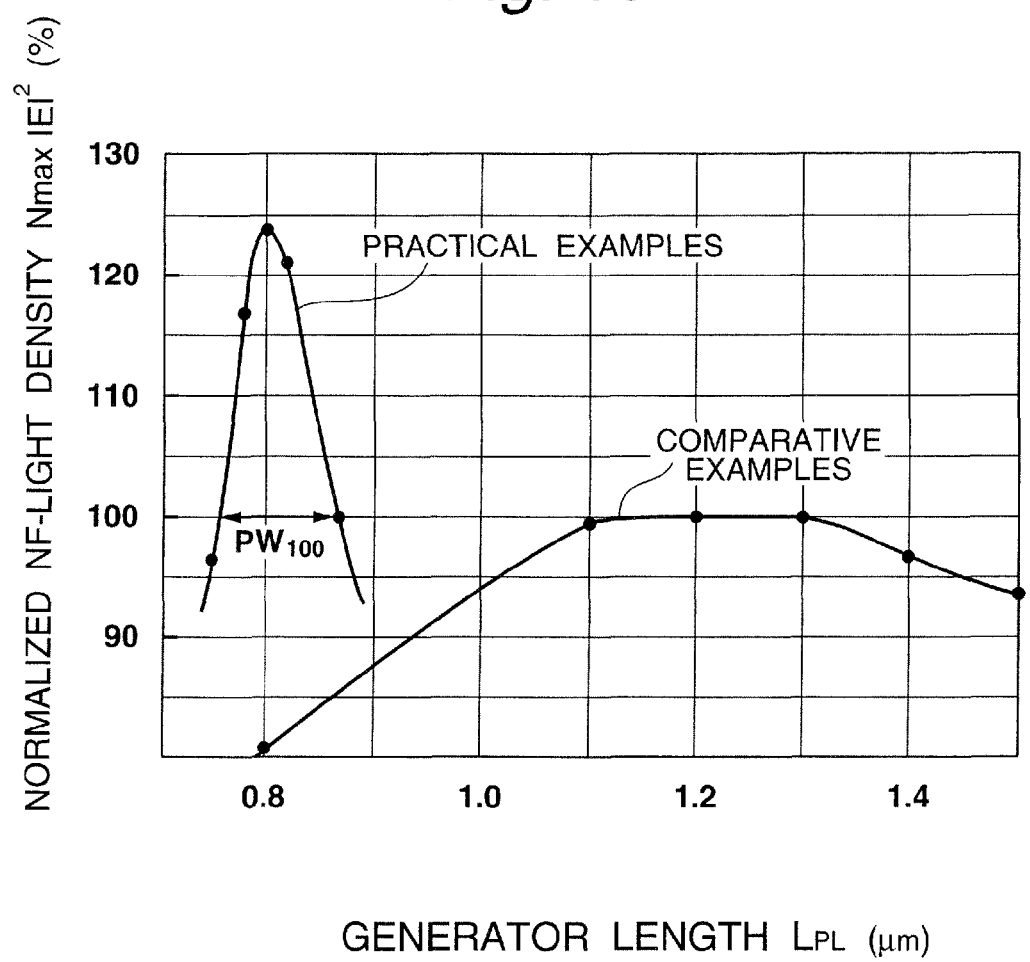
FIG. 10 shows a graph that plots the results of practical examples in Table 1 and the results of comparative examples in Table 2.

Table 1 shows the relationship between the length $L_{PL}$ of the plasmon generator 91 and the light density max$|E|^2$ of NF-light generated from the NF-light generating point NFP in the practical examples including the resonator mirror 94. Table 2 shows the relationship between the length $L_{PL}$ of the plasmon generator 91 and the light density max$|E|^2$ of NF-light generated from the NF-light generating point NFP in the comparative examples that do not include a resonator mirror 94. Here, Nmax$|E|^2$ in Tables 1 and 2 is the normalized light density max$|E|^2$ (%) based on the light density max$|E|^2$ (100%) of NF-light generated in the case of the length $L_{PL}$=1.2 μm in the comparative examples (without a resonator mirror 94, in Table 2). FIG. 9 shows a graph for obtaining effective refractive index $n_{EFFPG}$ when surface plasmon propagates along the propagation edge 910 in a surface plasmon mode. FIG. 10 shows a graph that plots the results of practical examples in Table 1 and the results of comparative examples in Table 2. The vertical axis of FIG. 10 represents Nmax$|E|^2$ (%) described above.

TABLE 1

| | Length $L_{PL}$ (μm) | | | | |
|---|---|---|---|---|---|
| | 0.75 | 0.78 | 0.8 | 0.82 | 0.87 |
| Light density max$|E|^2$ $((V/m)^2)$ | 0.77 | 0.94 | 0.99 | 0.97 | 0.80 |
| Nmax$|E|^2$ (%) | 96 | 117 | 124 | 121 | 100 |

TABLE 2

| | Length $L_{PL}$ (μm) | | | | | |
|---|---|---|---|---|---|---|
| | 0.8 | 1.1 | 1.2 | 1.3 | 1.4 | 1.5 |
| Light density max$|E|^2$ $((V/m)^2)$ | 0.65 | 0.80 | 0.80 | 0.80 | 0.77 | 0.75 |
| Nmax$|E|^2$ (%) | 81 | 99 | 100 | 100 | 96 | 93 |

Referring to FIG. 10, a broad peak of 100% appears at the lengths $L_{PL}$ of plasmon generator 91 of 1.2 μm and 1.3 μm in the plot of Nmax$|E|^2$ of the comparative examples without a resonator mirror 94 (Table 2). Here, the fact that Nmax$|E|^2$ has the maximum value as a function of the length $L_{PL}$ can be attributed to competition between the effect that the strength of coupling in the surface plasmon mode increases as the length $L_{PL}$ increases and increase in energy with which surface plasmon transfers from the waveguide 90 to the plasmon generator 91 and returns to the waveguide 90. In contrast, in the practical examples (Table 1) in which the resonator mirror 94 was provided, the plot of Nmax$|E|^2$ has a sharper peak of 124% at a length $L_{PL}$ of plasmon generator 91 of 0.8 μm.

The correspondence between the sharp peak and resonance in the practical examples will be considered below. The length $L_{PL}$(m) of the plasmon generator 91 when surface plasmon propagating along the propagation edge 910 resonates because of the provision of the resonator mirror 94 to form a standing wave of surface plasmon (electromagnetic field) that has m anti-nodes can be expressed as:

$$L_{PL}(m)=\lambda_0 \cdot m/(2 \cdot n_{EFFPG}) \qquad (3)$$

Here, $\lambda_0$ is the wavelength of laser light incident on the waveguide 90 in a vacuum and $n_{EFFPG}$ is the effective refractive index when surface plasmon propagates along the propagation edge 910 in a surface plasmon mode.

The length $L_{PL}=0.8$ μm that provides the maximum value of light density max|E|$^2$ in the practical examples with the resonator mirror 94 in FIG. 10 is approximately equal to $L_{PL}(4)$ when m=4, $\lambda_0$=800 nm, and $n_{EFFPG}$=2.001 in Expression (3) ($L_{PL}(4)$=799.6 nm). That is, it can be seen that the maximum value of the light density max|E|$^2$ in the practical examples with the resonator mirror 94 was obtained as a consequence of amplification of surface plasmon due to the formation of a standing wave of the surface plasmon (electromagnetic field) that has four anti-nodes along the propagation edge 910. The maximum value (0.99 (V/m)$^2$) of the light density max|E|$^2$ is 24% greater than the maximum value (0.80 (V/m)$^2$) at lengths $L_{PL}$=1.2 μm and 1.3 μm in the comparative examples without a resonator mirror 94. That is, it can be seen that the provision of the resonator mirror 94 enables the plasmon generator 91 having a length as small as on the order of 62 to 67% of the length of the plasmon generator of the comparative examples to generate NF-light having a light density 24% greater than that of NF-light obtained in an optical system without a resonator structure.

The value of $n_{EFFPG}$ (2.001) substituted into Expression (3) was derived by using the results of the simulation experiment shown in FIG. 9. In the simulation experiment, the relationship between: the refractive index $n_{BF}$ of the protective layer 93 (including the buffering portion) that covers the waveguide 90, the surface plasmon generator 91 and the main magnetic pole 92; and the effective refractive index $n_{EFFPG}$ was calculated. The results showed that: when the refractive index $n_{BF}$=1.45, 1.65 and 1.8, the effective refractive index $n_{EFFPG}$ were 1.751, 2.001 and 2.217, respectively. The results are plotted in FIG. 9. Referring to FIG. 9, the refractive index $n_{BF}$ is related to the effective refractive index $n_{EFFPG}$ as: $n_{EFFPG}$=1.328·$n_{BF}$−0.1796. In the practical examples, the protective layer 93 was made of Al$_2$O$_3$ ($n_{BF}$=0.65). Therefore, from the equation, $n_{EFFPG}$=2.001 is obtained.

Further, referring to FIG. 10, the peak width PW$_{100}$ of the peak at Nmax|E|$^2$=100% is 0.11 μm in the practical examples with the resonator mirror 94. The value is approximately 55% (=27.5%×2) of the length of a standing wave of surface plasmon (electromagnetic field) that has one anti-node ($\lambda_0/(2·n_{EFFPG})$) (=0.200 μm). Therefore, the length $L_{PL}$ of the plasmon generator 91 that can provide a light density max|E|$^2$ greater than or equal to the maximum value of the light density in the comparative examples without a resonator mirror 94 can be expressed as:

$$(\lambda_0·m/(2·n_{EFFPG}))-0.275·/(\lambda_0/(2·n_{EFFPG})) \leq L_{PL} \leq (\lambda_0·m/(2·n_{EFFPG}))+0.275·(\lambda_0/(2·n_{EFFPG})) \quad (1)$$

By using the plasmon generator 91 that has a length $L_{PL}$ that satisfies Expression (1), a standing wave of surface plasmon (electromagnetic field) that has m anti-nodes can be formed along the propagation edge 910. As a result, there can be generated NF-light that has a light density higher than or equal to that in the comparative examples that requires longer length $L_{PL}$. Thus, it will be understood that the length $L_{PL}$ of the plasmon generator 91 preferably satisfies Expression (1), more preferably, satisfies Expression (3).

From the foregoing, it will be understood that according to the present invention, NF-light that has a higher light density can be generated by amplifying excited surface plasmon by using a resonator structure while reducing the length of the plasmon generator to reduce absorption of surface plasmon and prevent overheating of the plasmon generator. As a result, a plasmon resonating optical system that offers higher light use efficiency can be implemented and can be used to perform thermally-assisted magnetic recording with a higher recording density.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A surface plasmon resonating optical system comprising:
   a waveguide through which a light for exciting surface plasmon propagates;
   a plasmon generator configured to be coupled with the light in a surface plasmon mode and to emit near-field light from its near-field light generating end surface; and
   a resonator mirror provided on an end surface of the plasmon generator that is opposite to the near-field light generating end surface, and configured to reflect the excited surface plasmon.

2. The surface plasmon resonating optical system as claimed in claim 1, wherein the resonator mirror is one mirror in a Fabry-Perot resonator in which the other mirror is an object to be irradiated with the near-field light.

3. The surface plasmon resonating optical system as claimed in claim 1, wherein a length of the plasmon generator is equal to or more than $(\lambda_0·m/(2·n_{EFFPG}))-0.275·(\lambda_0/(2·n_{EFFPG}))$, and less than or equal to $(\lambda_0·m/(2·n_{EFFPG}))+0.275·(\lambda_0/(2·n_{EFFPG}))$, where $\lambda_0$ is a wavelength of the light in a vacuum, $n_{EFFPG}$ is an effective refractive index when the surface plasmon propagates along the plasmon generator, and m is a natural number.

4. The surface plasmon resonating optical system as claimed in claim 1, wherein the plasmon generator comprises a propagation edge that extends to the near-field light generating end surface and propagates the surface plasmon excited by the light.

5. The surface plasmon resonating optical system as claimed in claim 4, wherein an end of the propagation edge that is opposite to the near-field light generating end surface abuts on a reflecting surface of the resonator mirror.

6. A thermally-assisted magnetic recording head comprising:
   a magnetic pole that generates write field from its end on an opposed-to-medium surface side;
   a waveguide through which a light for exciting surface plasmon propagates;
   a plasmon generator provided between the magnetic pole and waveguide, and configured to be coupled with the light in a surface plasmon mode and to emit near-field light from its near-field light generating end surface on the opposed-to-medium surface side; and
   a resonator mirror provided on an end surface of the plasmon generator that is opposite to the near-field light generating end surface, and configured to reflect the excited surface plasmon.

7. The thermally-assisted magnetic recording head as claimed in claim 6, wherein the resonator mirror is one mirror in a Fabry-Perot resonator in which the other mirror is a portion of a magnetic recording medium that faces the near-field light generating end surface during writing data.

8. The thermally-assisted magnetic recording head as claimed in claim 6, wherein a length of the plasmon generator is equal to or more than $(\lambda_0·m/(2·n_{EFFG}))-0.275·(\lambda_0/(2·n_{EFFPG}))$, and less than or equal to $(\lambda_0·m/(2·n_{EFFPG}))+$ $0.275 \cdot (\lambda_0/(2 \cdot n_{EFFPG}))$, where $\lambda_0$ is a wavelength of the light in a vacuum, $n_{EFFPG}$ is an effective refractive index when the surface plasmon propagates along the plasmon generator, and m is a natural number.

9. The thermally-assisted magnetic recording head as claimed in claim 6, wherein the plasmon generator comprises a propagation edge that extends to the near-field light generating end surface and propagates the surface plasmon excited by the light.

10. The thermally-assisted magnetic recording head as claimed in claim 9, wherein an end of the propagation edge that is opposite to the near-field light generating end surface abuts on a reflecting surface of the resonator mirror.

11. The thermally-assisted magnetic recording head as claimed in claim 9, wherein the magnetic pole is in surface contact with a surface portion of the plasmon generator, the surface portion excluding the propagation edge.

12. The thermally-assisted magnetic recording head as claimed in claim 9, wherein the plasmon generator comprises an opposed-to-waveguide surface that is opposed to the waveguide with a predetermined distance, and the propagation edge is located on a side opposite to the opposed-to-waveguide surface.

13. The thermally-assisted magnetic recording head as claimed in claim 9, wherein the plasmon generator comprises a contact-to-waveguide surface that is in surface contact with the waveguide, and the propagation edge is located on a side opposite to the contact-to-waveguide surface.

14. The thermally-assisted magnetic recording head as claimed in claim 9, wherein at least a portion of the propagation edge is opposed to the waveguide with a predetermined distance and couples with the light in a surface plasmon mode.

15. The thermally-assisted magnetic recording head as claimed in claim 6, wherein the plasmon generator is covered with a material that has a refractive index lower than a refractive index of a constituent material of the waveguide.

16. The thermally-assisted magnetic recording head as claimed in claim 6, wherein a magnetic shield is provided on a side opposite to the magnetic pole when viewed from the plasmon generator.

17. A head gimbal assembly comprising: a thermally-assisted magnetic recording head as claimed in claim 6; and a suspension supporting the thermally-assisted magnetic recording head.

18. A magnetic recording apparatus comprising:
at least one head gimbal assembly comprising: a thermally-assisted magnetic recording head; and a suspension supporting the thermally-assisted magnetic recording head;
at least one magnetic recording medium; and
a recording circuit configured to control write operations that the thermally-assisted magnetic recording head performs to the at least one magnetic recording medium,
the thermally-assisted magnetic recording head comprising:
a magnetic pole that generates write field from its end on an opposed-to-medium surface side;
a waveguide through which a light for exciting surface plasmon propagates;
a plasmon generator provided between the magnetic pole and waveguide, and configured to be coupled with the light in a surface plasmon mode and to emit near-field light from its near-field light generating end surface on the opposed-to-medium surface side; and
a resonator mirror provided on an end surface of the plasmon generator that is opposite to the near-field light generating end surface, and configured to reflect the excited surface plasmon, and
the recording circuit further comprising a light-emission control circuit configured to control operations of a light source that generates the light for exciting surface plasmon.

19. The magnetic recording apparatus as claimed in claim 18, wherein the resonator mirror and a portion of the magnetic recording medium that faces the near-field light generating end surface constitute a Fabry-Perot resonator.

* * * * *